United States Patent
Kobayashi

(10) Patent No.: US 9,232,094 B2
(45) Date of Patent: Jan. 5, 2016

(54) SYSTEM AND METHOD FOR MOVE AND DROP OF CLONE IMAGE ON A TOUCH PANEL

(71) Applicant: Konica Minolta, Inc., Tokyo (JP)

(72) Inventor: Minako Kobayashi, Ikeda (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/060,648

(22) Filed: Oct. 23, 2013

(65) Prior Publication Data
US 2014/0118781 A1    May 1, 2014

(30) Foreign Application Priority Data
Oct. 26, 2012   (JP) .................................. 2012-237317

(51) Int. Cl.
| | |
|---|---|
| *G06K 15/00* | (2006.01) |
| *G06F 3/048* | (2013.01) |
| *H04N 1/00* | (2006.01) |
| *G06F 3/0486* | (2013.01) |

(52) U.S. Cl.
CPC ............ *H04N 1/00411* (2013.01); *G06F 3/048* (2013.01); *G06F 3/0486* (2013.01); *H04N 1/00384* (2013.01); *H04N 1/00413* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2007/0216938 A1 | 9/2007 | Tomita | |
| 2008/0231914 A1* | 9/2008 | Motoyoshi | ................... 358/474 |
| 2008/0301569 A1* | 12/2008 | Akagi | ........................... 715/761 |
| 2010/0122194 A1 | 5/2010 | Rogers | |
| 2011/0018827 A1 | 1/2011 | Wang et al. | |
| 2012/0036479 A1 | 2/2012 | Kasahara et al. | |
| 2013/0219343 A1* | 8/2013 | Nan et al. | ...................... 715/838 |

FOREIGN PATENT DOCUMENTS

| | | |
|---|---|---|
| JP | 2007-249461 A | 9/2007 |
| JP | 2010-211500 A | 9/2010 |

(Continued)

OTHER PUBLICATIONS

Office Action (Notice of Ground of Rejection) issued on Oct. 21, 2014, by the Japan Patent Office in corresponding Japanese Patent Application No. 2012-237317, and an English Translation of the Office Action. (10 pages).

*Primary Examiner* — Benny Q Tieu
*Assistant Examiner* — Haris Sabah
(74) *Attorney, Agent, or Firm* — Buchanan Ingersoll & Rooney PC

(57) ABSTRACT

A data processing apparatus includes a position detection portion for detecting a position designated on a display, a data select portion for selecting data identified by a first image displayed on the display as target data, a clone image display portion for arranging a clone image corresponding to the first image at the detected position, a clone image moving portion for moving the clone image, a second image display portion for arranging one or more second images for identifying one or more kinds of processes executable on the target data at positions based on the position of the first image, a candidate process decision portion for deciding a process identified by the second image having a predetermined relative positional relation to the clone image as a candidate process, and an execution process decision portion for deciding the candidate process as an execution process when the position is no longer detected.

36 Claims, 15 Drawing Sheets

(56) References Cited

FOREIGN PATENT DOCUMENTS

| | | |
|---|---|---|
| JP | 2010-257104 A | 11/2010 |
| JP | 2011-028560 A | 2/2011 |
| JP | 2011-107823 A | 6/2011 |
| JP | 2011-238200 A | 11/2011 |
| JP | 2012-37978 A | 2/2012 |
| JP | 2012-508929 A | 4/2012 |

* cited by examiner

F I G. 4
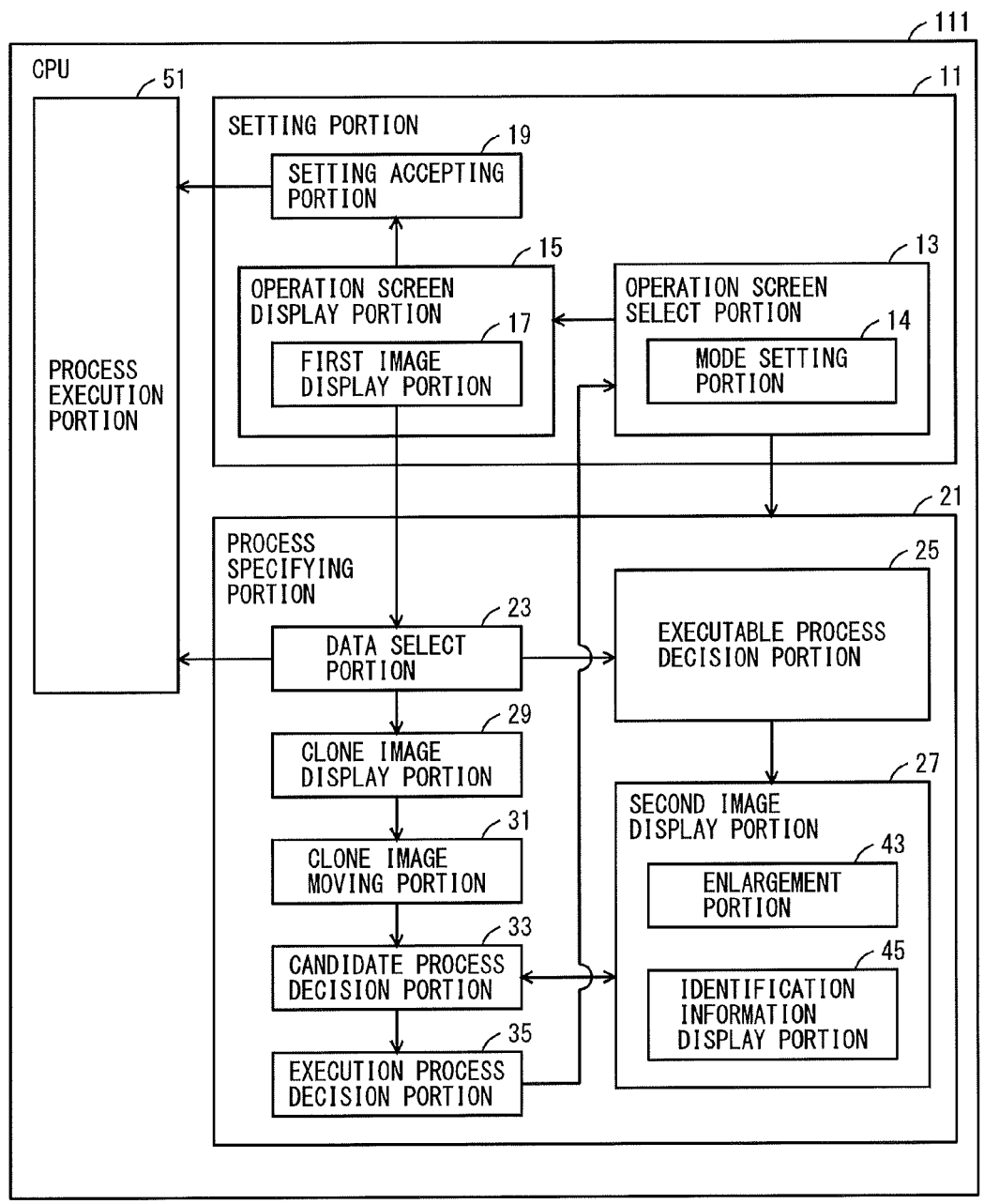

F I G. 1 1
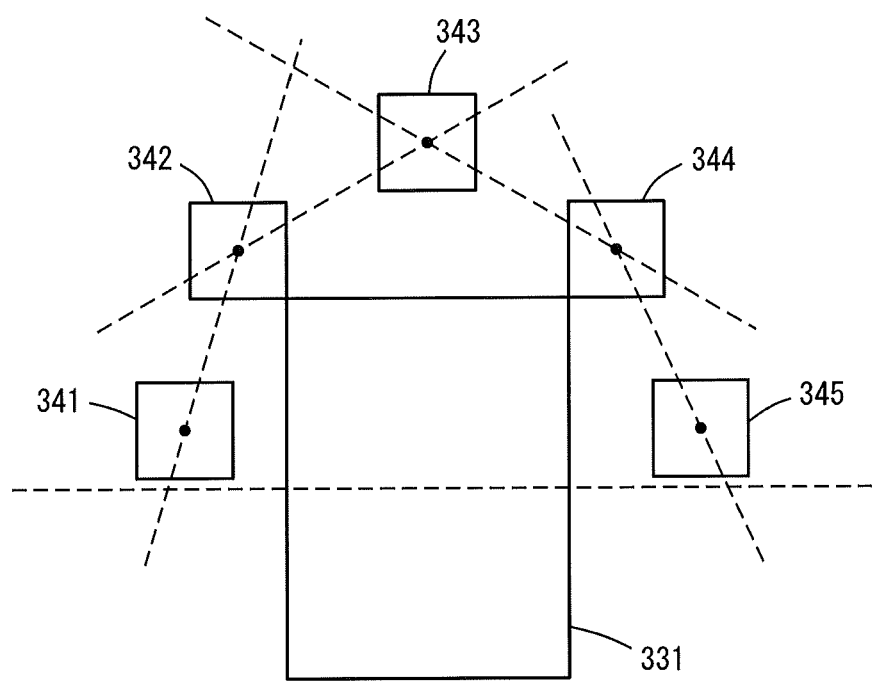

SYSTEM AND METHOD FOR MOVE AND DROP OF CLONE IMAGE ON A TOUCH PANEL

This application is based on Japanese Patent Application No. 2012-237317 filed with Japan Patent Office on Oct. 26, 2012, the entire content of which is hereby incorporated by reference.

BACKGROUND OF THE INVENTION

1. Field of the Invention

The present invention relates to a data processing apparatus, a setting method, and a setting program. More specifically, the present invention relates to a data processing apparatus capable of executing plural kinds of processes, a setting method executed in the data processing apparatus, and a non-transitory computer-readable recording medium encoded with a setting program.

2. Description of the Related Art

In recent years, touch panels are used as a user interface in data processing apparatuses such as Multi-Functional Peripherals (MFPs). The use of touch panels enables acceptance of drag operation and drop operation and makes operation easy.

For example, Japanese Patent Laid-Open No. 2010-257104 discloses a communication terminal including a content list display unit for displaying a content thumbnail indicating a content, a drag process detection unit for detecting drag operation on the content thumbnail, an application icon display unit for displaying a list of application icons indicating applications applicable to the content, a drop process detection unit for detecting drop operation on the dragged content thumbnail onto an application icon displayed in the list, and a content conversion process unit for, in response to detection of the drop operation, performing a conversion process on the content in compliance with applicable conditions of the application associated with the application icon on which the drop operation is performed.

However, in order to drag and drop a thumbnail, it is necessary to move a finger to the position where the thumbnail is to be dropped, with the finger kept on the touch panel. This may cause an operation error. Specifically, the finger may leave the touch panel during the process of moving the finger to the position where the thumbnail is to be dropped. As a result, the thumbnail may be dropped at a position not intended by the user. For example, when the distance over which the finger is moved is long, or depending on the direction in which the finger is moved, the possibility of an operation error may become higher. In many MFPs, the surface of the touch panel is set to be oriented upward in order to allow the user to view the operation screen easily in the standing posture. When the user in the standing posture operates the touch panel having the surface oriented upward, the operation of moving the finger frontward causes an operation error more frequently than the operation of moving the finger in other directions. The downward direction from the position designated by the finger in the screen is the frontward direction for the user, and the position lower than the position designated by the finger in the screen is partially hidden under the user's finger and becomes out of sight for the user. The operation of moving the finger is therefore difficult when the finger is moved to a region including such a position.

SUMMARY OF THE INVENTION

According to an aspect of the present invention, a data processing apparatus includes: a process execution portion capable of executing one or more kinds of processes on data; a display portion capable of displaying an image; a position detection portion to detect a position designated by a user in a display surface of the display portion; a first image display portion to display a first image for identifying data on the display portion; a data select portion to select data identified by the first image displayed on the display portion as process target data to be processed, based on the position detected by the position detection portion; a clone image display portion to arrange a clone image corresponding to the first image for identifying the process target data at the position detected by the position detection portion and to display the arranged clone image on the display portion, in response to the process target data being selected by the data select portion; a clone image moving portion to move the clone image by arranging the clone image at the position detected by the position detection portion and displaying the arranged clone image on the display portion while the position is continuously detected by the position detection portion after the process target data is selected by the data select portion; a second image display portion to arrange one or more second images for identifying one or more kinds of processes that can be executed by the process execution portion on the process target data, at positions defined based on a position where the first image is displayed, and to display the arranged one or more second images on the display portion, in response to the process target data being selected by the data select portion; a candidate process decision portion to decide a process identified by the second image having a predetermined relative positional relation to the clone image as a candidate process among the one or more second images when the clone image displayed by the clone image moving portion falls into a predetermined relative positional relation to any one of the one or more second images; and an execution process decision portion to decide the candidate process as an execution process to be executed by the process execution portion on the process target data when the position is no longer detected by the position detection portion in a state in which the clone image falls in a predetermined relative positional relation to the second image for identifying the candidate process.

According to another aspect of the present invention, a data processing apparatus includes: a process execution portion capable of executing one or more kinds of processes on data; a display portion capable of displaying an image; a position detection portion to detect a position designated by a user in a display surface of the display portion; a first image display portion to display a first image for identifying data on the display portion; a data select portion to select the data identified by the first image displayed on the display portion as process target data to be processed, based on the position detected by the position detection portion; a second image display portion to arrange one or more second images for identifying one or more kinds of processes that can be executed by the process execution portion on the process target data, at positions defined based on a start position detected by the position detection portion at a point of time when the process target data is selected by the data select portion, and to display the arranged one or more second images on the display portion, in response to the process target data being selected by the data select portion; a candidate process decision portion to decide a process identified by the second image having a predetermined relative positional relation to the position continuously detected by the position detection portion as a candidate process among the one or more second images when the position continuously detected by the position detection portion falls into a predetermined relative positional relation to any one of the one or more second images; and an execution process decision portion to decide the candidate process as an execution process to be executed by the process execution portion on the process target data when the position is no longer detected by the position detection portion in a state in which the position detected by the position detection portion falls into a predetermined relative positional relation to the second image for identifying the candidate process.

According to a further aspect of the present invention, a setting method is executed in a data processing apparatus including a process execution portion capable of executing one or more kinds of processes on data and a display portion capable of displaying an image. The method includes: a position detection step of detecting a position designated by a user in a display surface of the display portion; a first image display step of displaying a first image for identifying data on the display portion; a data select step of selecting data identified by the first image displayed on the display portion as process target data to be processed, based on the position detected in the position detection step; a clone image display step of arranging a clone image corresponding to the first image for identifying the process target data at the position detected in the position detection step and displaying the arranged clone image on the display portion, in response to the process target data being selected in the data select step; a clone image moving step of moving the clone image by arranging the clone image at the position detected in the position detection step and displaying the arranged clone image on the display portion while the position is continuously detected in the position detection step after the process target data is selected in the data select step; a second image display step of arranging one or more second images for identifying one or more kinds of processes that can be executed by the process execution portion on the process target data, at positions defined based on a position where the first image is displayed, and displaying the arranged one or more second images on the display portion, in response to the process target data being selected in the data select step; a candidate process decision step of deciding a process identified by the second image having a predetermined relative positional relation to the clone image as a candidate process among the one or more second images when the clone image displayed in the clone image moving step falls into a predetermined relative positional relation to any one of the one or more second images; and an execution process decision step of deciding the candidate process as an execution process to be executed by the process execution portion on the process target data when the position is no longer detected in the position detection step in a state in which the clone image falls in a predetermined relative positional relation to the second image for identifying the candidate process.

According to a still further aspect of the present invention, a setting method executed in a data processing apparatus including a process execution portion capable of executing one or more kinds of processes on data and a display portion capable of displaying an image. The method includes: a position detection step of detecting a position designated by a user in a display surface of the display portion; a first image display step of displaying a first image for identifying data on the display portion; a data select step of selecting data identified by the first image displayed on the display portion as process target data to be processed, based on the position detected in the position detection step; a second image display step of arranging one or more second images for identifying one or more kinds of processes that can be executed by the process execution portion on the process target data, at positions defined based on a start position detected in the position detection step at a point of time when the process target data is selected in the data select step, and displaying the arranged one or more second images on the display portion, in response to the process target data being selected in the data select step; a candidate process decision step of deciding a process identified by the second image having a predetermined relative positional relation to the position continuously detected in the position detection step as a candidate process among the one or more second images when the position continuously detected in the position detection step falls into a predetermined relative positional relation to any one of the one or more second images; and an execution process decision step of deciding the candidate process as an execution process to be executed by the process execution portion on the process target data when the position is no longer detected in the position detection step in a state in which the position detected in the position detection step falls in a predetermined relative positional relation to the second image for identifying the candidate process.

According to another aspect of the present invention, a non-transitory computer-readable recording medium is encoded with a setting program performed by a computer which controls a data processing apparatus. The data processing apparatus includes a process execution portion capable of executing one or more kinds of processes on data and a display portion capable of displaying an image. The setting program causes the computer to execute: a position detection step of detecting a position designated by a user in a display surface of the display portion; a first image display step of displaying a first image for identifying data on the display portion; a data select step of selecting data identified by the first image displayed on the display portion as process target data to be processed, based on the position detected in the position detection step; a clone image display step of arranging a clone image corresponding to the first image for identifying the process target data at the position detected in the position detection step and displaying the arranged clone image on the display portion, in response to the process target data being selected in the data select step; a clone image moving step of moving the clone image by arranging the clone image at the position detected in the position detection step and displaying the arranged clone image on the display portion while the position is continuously detected in the position detection step after the process target data is selected in the data select step; a second image display step of arranging one or more second images for identifying one or more kinds of processes that can be executed by the process execution portion on the process target data, at positions defined based on a position where the first image is displayed, and displaying the arranged one or more second images on the display portion, in response to the process target data being selected in the data select step; a candidate process decision step of deciding a process identified by the second image having a predetermined relative positional relation to the clone image as a candidate process among the one or more second images when the clone image displayed in the clone image moving step falls into a predetermined relative positional relation to any one of the one or more second images; and an execution process decision step of deciding the candidate process as an execution process to be executed by the process execution portion on the process target data when the position is no longer detected in the position detection step in a state in which the clone image falls in a predetermined relative positional relation to the second image for identifying the candidate process.

According to yet another aspect of the present invention, a non-transitory computer-readable recording medium is encoded with a setting program performed by a computer which controls a data processing apparatus. The data processing apparatus includes a process execution portion capable of executing one or more kinds of processes on data and a display portion capable of displaying an image. The setting program causes the computer to execute: a position detection step of detecting a position designated by a user in a display surface of the display portion; a first image display step of displaying a first image for identifying data on the display portion; a data select step of selecting the data identified by the first image displayed on the display portion as process target data to be processed, based on the position detected in the position detection step; a second image display step of arranging one or more second images for identifying one or more kinds of processes that can be executed by the process execution portion on the process target data, at positions defined based on a start position detected in the position detection step at a point of time when the process target data is selected in the data select step, and displaying the arranged one or more second images on the display portion, in response to the process target data being selected in the data select step; a candidate process decision step of deciding a process identified by the second image having a predetermined relative positional relation to the position continuously detected in the position detection step as a candidate process among the one or more second images when the position continuously detected in the position detection step falls into a predetermined relative positional relation to any one of the one or more second images; and an execution process decision step of deciding the candidate process as an execution process to be executed by the process execution portion on the process target data when the position is no longer detected in the position detection step in a state in which the position detected in the position detection step falls in a predetermined relative positional relation to the second image for identifying the candidate process.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 4 is a block diagram showing an example of functions of the CPU of the MFP in the first embodiment.

FIG. 11 is a diagram illustrating arrangement of three or more second images.

DESCRIPTION OF THE PREFERRED EMBODIMENTS

Figure 1:
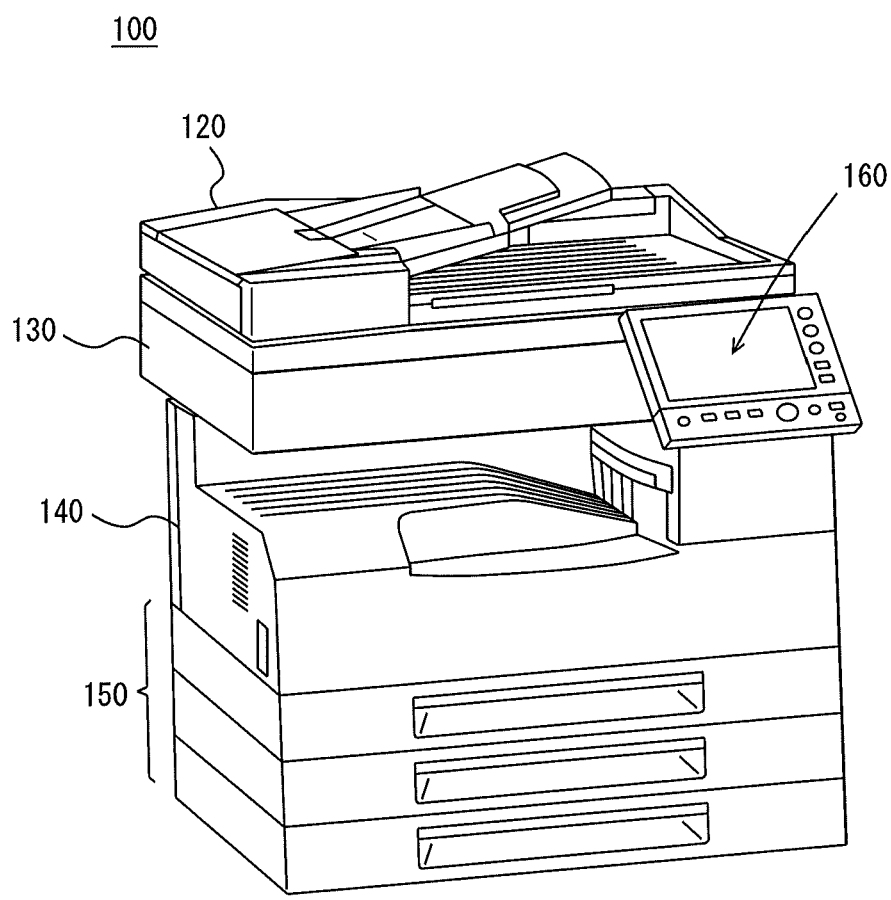
FIG. 1 is an external perspective view of an MFP in a first embodiment.

Embodiments of the present invention will be described below with reference to the figures. In the following description, the same parts are denoted with the same reference numerals. Their names and functions are also the same. Therefore, a detailed description thereof will not be repeated.

First Embodiment

Figure 2:
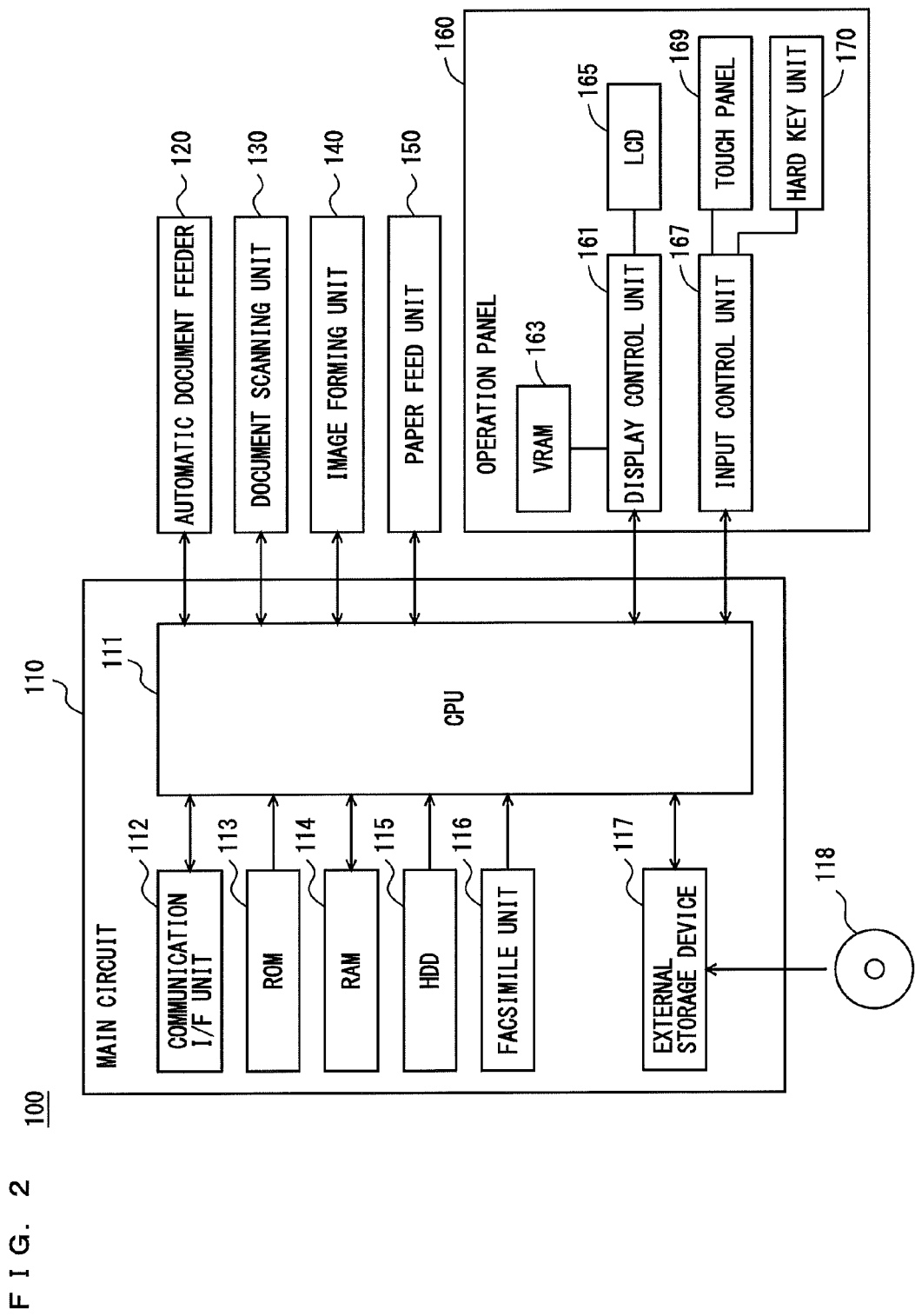
FIG. 2 is a block diagram showing an overall hardware configuration of the MFP.

FIG. 1 is an external perspective view of an MFP in a first embodiment. FIG. 2 is a block diagram showing an overall hardware configuration of the MFP. Referring to FIG. 1 and FIG. 2, MFP 100 functioning as a data processing apparatus includes a main circuit 110, a document scanning unit 130 for scanning a document, an automatic document feeder 120 for conveying a document to document scanning unit 130, an image forming unit 140 for forming an image on a sheet of paper based on image data output by document scanning unit 130 scanning a document, a paper feed unit 150 for supplying paper to image forming unit 140, and an operation panel 160 serving as a user interface.

Main circuit 110 includes a CPU 111 for controlling the entire MFP 100, a communication I/F (interface) unit 112, a ROM 113, a RAM 114, an HDD (Hard Disk Drive) 115 serving as a mass storage device, a facsimile unit 116, and an external storage device 117. CPU 111 is connected to automatic document feeder 120, document scanning unit 130, image forming unit 140, paper feed unit 150, and operation panel 160 to control the entire MFP 100.

Automatic document feeder 120 automatically conveys plural sheets of a document set on a document feed tray, sheet by sheet, to a predetermined document scan position set on the platen glass of document scanning unit 130, and discharges the document having a document image read by document scanning unit 130 onto a document output tray. Document scanning unit 130 includes a light source for applying light to a document conveyed to the document scan position and a photoelectric transducer receiving light reflected by the document for scanning a document image in accordance with a document size. The photoelectric transducer converts the received light into image data that is an electrical signal for output to image forming unit 140. Paper feed unit 150 conveys paper accommodated in a paper feed tray to image forming unit 140.

Image forming unit 140 forms an image by a well-known electrophotographic technique. Image forming unit 140 forms an image on paper conveyed by paper feed unit 150, based on image data produced by subjecting image data input from document scanning unit 130 to a variety of data processing such as shading correction, or image data received from the outside.

Facsimile unit 116 is connected to a PSTN (Public Switched Telephone Network) to transmit facsimile data to the PSTN or receive facsimile data from the PSTN. Facsimile unit 116 stores the received facsimile data into HDD 115 and converts the received facsimile data into print data printable by image forming unit 140 for output to image forming unit 140. Image forming unit 140 thus forms an image on paper based on the facsimile data received by facsimile unit 116. Facsimile unit 116 also converts data stored in HDD 115 into facsimile data and transmits the facsimile data to a facsimile machine connected to the PSTN.

Communication I/F unit 112 is an interface for connecting MFP 100 to a network. Communication I/F unit 112 communicates with another computer or a data processing apparatus connected to the network with a communication protocol such as TCP (Transmission Control Protocol) or FTP (File Transfer Protocol). The network to which communication I/F unit 112 is connected is a LAN (Local Area Network), either wired or wireless. The network is not limited to a LAN and may be a WAN (Wide Area Network), a PSTN, or the Internet.

ROM 113 stores a program executed by CPU 111 or data necessary to execute the program. RAM 114 is used as a working area when CPU 111 executes a program. RAM 114 temporarily stores scan images successively sent from document scanning unit 130.

Operation panel 160 includes an LCD (Liquid Crystal Display) 165, a display control unit 161 for controlling display of LCD 165, a VRAM (Video RAM) 163, a touch panel 169, a hard key unit 170 including a start key 171 (see FIG. 3), and an input control unit 167 for controlling touch panel 169 and hard key unit 170. LCD 165 and hard key unit 170 are provided on the top surface of MFP 100. LCD 165 may be replaced by any other device that displays an image, for example, an organic EL (Electroluminescence) display.

Display control unit 161 is connected to CPU 111, VRAM 163, and LCD 165. VRAM 163 is used as a working area for display control unit 161 and temporarily stores an image to be displayed on LCD 165. Display control unit 161 is controlled by CPU 111 to control LCD 165 and allows LCD 165 to display an image stored in VRAM 163. Display control unit 161 allows LCD 165 to display an operation screen and an input screen as described later.

Hard key unit 170 includes a plurality of hard keys at least including a start key 171. The hard key is connected to input control unit 167, outputs an ON signal to input control unit 167 while being pressed by the user, and outputs an OFF signal to input control unit 167 while not being pressed by the user.

Touch panel 169 is provided on the upper or lower surface of LCD 165 and outputs the coordinates of a position pressed by the user to input control unit 167. Touch panel 169 detects a position designated by the user with a finger or a stylus pen and outputs the coordinates of the designated position to input control unit 167. Touch panel 169 preferably has a size equal to or larger than the display surface of LCD 165. Touch panel 169 is overlaid on LCD 165, so that the user designates the display surface of LCD 165 to allow touch panel 169 to output the coordinates of a position designated by the user in the display surface of LCD 165 to input control unit 167. Examples of the touch panel include resistant-film, surface-acoustic-wave, infrared, electromagnetic, and capacitive touch panels, though not being limited thereto.

If hard key unit 170 has a hard key outputting an ON signal, input control unit 167 outputs identification information of the hard key outputting an ON signal to CPU 111. When touch panel 169 detects a position designated by the user, input control unit 167 outputs the coordinates output from touch panel 169 to CPU 111.

External storage device 117 is controlled by CPU 111. A CD-ROM (Compact Disk Read Only Memory) 118 or a semiconductor memory is attached to external storage device 117. In the present embodiment, CPU 111 executes a program stored in ROM 113, by way of example. However, CPU 111 may control external storage device 117 to read out a program to be executed by CPU 111 from CD-ROM 118 and store the read program into RAM 102 for execution.

A medium encoded with a program executed by CPU 111 is not limited to CD-ROM 118 but may be a flexible disk, a cassette tape, an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM). CPU 111 may download a program from another computer connected to the network and store the program into HDD 115, or a computer connected to the network may write a program into HDD 115 so that the program stored in HDD 115 is loaded to RAM 114 and executed by CPU 111. The program referred to here includes not only a program directly executable by CPU 111 but also a source program, a compressed program, an encrypted program, and the like.

Figure 3:
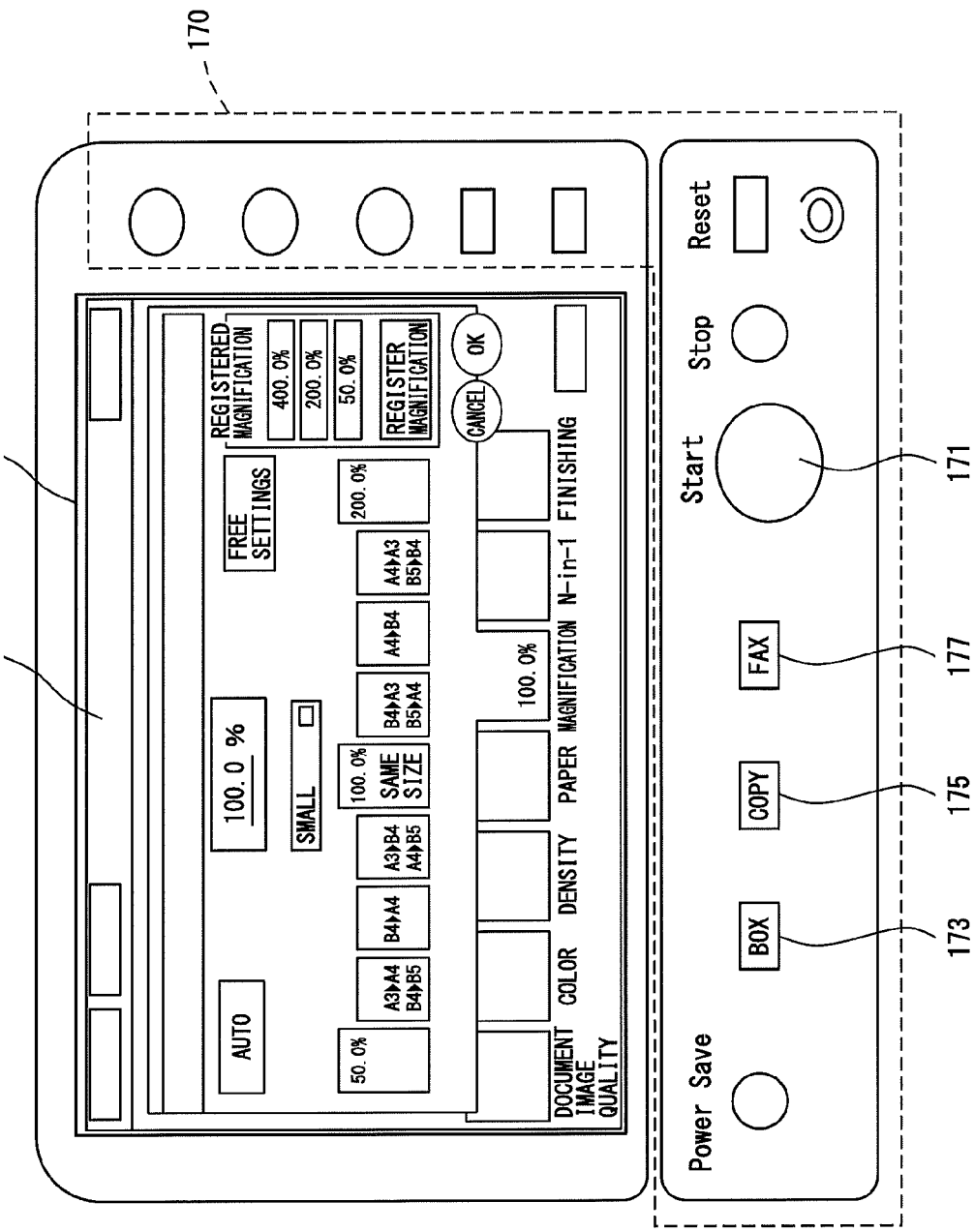
FIG. 3 is a plan view of an operation panel.

FIG. 3 is a plan view of operation panel 160. Referring to FIG. 3, operation panel 160 includes LCD 165, touch panel 169 overlaid on LCD 165, and hard key unit 170 with a plurality of hard keys including start key 171, a BOX key 173, a COPY key 175, and a FAX key 177 arranged on the right of and below LCD 165.

FIG. 4 is a block diagram showing an example of functions of the CPU of the MFP in the first embodiment. The functions shown in FIG. 4 are implemented by CPU 111 by CPU 111 of MFP 100 executing a setting program stored in ROM 113, HDD 115, or CD-ROM 118. Referring to FIG. 4, CPU 111 includes a setting portion 11, a process specifying portion 21, and a process execution portion 51. Process execution portion 51 controls hardware resources of MFP 100 and executes plural kinds of processes under process conditions set by setting portion 11. The hardware resources of MFP 100 are communication I/F unit 112, facsimile unit 116, HDD 115, external storage device 117, automatic document feeder 120, document scanning unit 130, image forming unit 140, and paper feed unit 150. Process execution portion 51 controls one or more of those hardware resources.

Examples of plural kinds of processes executed by process execution portion 51 include a scan process, a copy process, a print process, a data transmission process, a facsimile transmission/reception process, and a data edition process. When a setting of executing a scan process is made as one of process conditions, process execution portion 51 controls automatic document feeder 120, document scanning unit 130, HDD 115, external storage device 117, and communication I/F unit 112 and outputs an image of a document scanned by document scanning unit 130 to at least one of HDD 115, external storage device 117, and communication I/F unit 112 in accordance with the process conditions. When a process condition of setting HDD 115 as an output destination is set as one of process conditions, process execution portion 51 stores an image into HDD 115. When a process condition of setting external storage device 117 as an output destination is set as one of process conditions, process execution portion 51 stores an image into a semiconductor memory attached to external storage device 117. When a process condition of setting communication I/F unit 112 as an output destination is designated as one of process conditions, process execution portion 51 transmits an image through communication I/F unit 112. Examples of the transmission method include email transmission, FTP (File Transfer Protocol), and SMB (Server Message Block). When email transmission is set as a transmission method, an email with an image attached is generated and transmitted.

When a setting of executing a copy process is made as one of process conditions, process execution portion 51 controls automatic document feeder 120, document scanning unit 130, paper feed unit 150, and image forming unit 140 and allows image forming unit 140 to form an image of a document scanned by document scanning unit 130 on paper supplied from paper feed unit 150 in accordance with the set process conditions.

When a setting of executing a print process is made as one of process conditions, process execution portion 51 controls communication I/F unit 112, HDD 115, external storage device 117, image forming unit 140, and paper feed unit 150 and allows image forming unit 140 to form an image on paper supplied from paper feed unit 150 in accordance with the set process conditions. The image formed by image forming unit 140 is set by one of process conditions and is an image of print data received from a computer connected to the network through communication I/F unit 112 or an image of data stored in HDD 115 or external storage device 117.

When a setting of executing a data transmission process is made as one of process conditions, process execution portion 51 controls HDD 115 and transmits data stored in HDD 115 through communication I/F unit 112. Examples of the transmission method include email transmission, FTP (File Transfer Protocol), and SMB (Server Message Block). When email transmission is set as a transmission method, an email with data attached is generated and transmitted.

When a setting of executing a facsimile transmission process is made as one of process conditions, process execution portion 51 controls automatic document feeder 120, document scanning unit 130, HDD 115, external storage device 117, and facsimile unit 116 and allows facsimile unit 116 to transmit an image of facsimile data. The facsimile data transmitted by facsimile unit 116 is set by one of process conditions and is an image output by document scanning unit 130 scanning a document in accordance with the process conditions or an image of data stored in HDD 115 or external storage device 117.

When a setting of executing a facsimile reception process is made as one of process conditions, process execution portion 51 controls facsimile unit 116, HDD 115, external storage device 117, image forming unit 140, and paper feed unit 150 and outputs an image of the received facsimile data. When a process condition of setting HDD 115 as an output destination is set as one of process conditions, process execution portion 51 stores an image of facsimile data into HDD 115. When a process condition of setting external storage device 117 as an output destination is set as one of process conditions, process execution portion 51 stores an image of facsimile data into a semiconductor memory attached to external storage device 117. When a process condition of setting image forming unit 140 as an output destination is set as one of process conditions, process execution portion 51 outputs facsimile data to image forming unit 140 and allows image forming unit 140 to form an image of the facsimile data on paper. When a process condition of setting communication I/F unit 112 as an output destination is set as one of process conditions, process execution portion 51 generates an email with an image of facsimile data attached and transmits the email through communication I/F unit 112.

The data edition process is a process of setting data stored in HDD 115 as a process target and here includes a rotation process of rotating an image of data and a deletion process of deleting data. When a setting of executing a rotation process is made as one of process conditions, process execution portion 51 updates data stored in HDD 115 with data produced by rotating the image. When a setting of executing a deletion process is made as one of process conditions, process execution portion 51 deletes data stored in HDD 115 from HDD 115.

Setting portion 11 includes an operation screen select portion 13, an operation screen display portion 15, and a setting value accepting portion 19. Operation screen select portion 13 selects one of a plurality of operation screens stored beforehand in HDD 115 and outputs the screen identification information for identifying the selected operation screen to operation screen display portion 15 and process specifying portion 21.

The operation screens include a setting screen and a data select screen. The setting screen is a screen for setting a setting value for each of one or more setting items that define process conditions for process execution portion 51 to execute a process, and has a setting area for displaying a setting value for each of one or more setting items. The setting screen may have an area in which an image of the item name for describing a setting item is displayed in vicinity of the setting area. Examples of the setting screen include a setting screen for allowing process execution portion 51 to execute a scan process, a setting screen for allowing process execution portion 51 to execute a copy process, a setting screen for allowing process execution portion 51 to execute a copy process, a setting screen for allowing process execution portion 51 to execute a data transmission process, a setting screen for allowing process execution portion 51 to execute a facsimile transmission/reception process, a setting screen for allowing process execution portion 51 to execute a rotation process, and a setting screen for allowing process execution portion 51 to execute a deletion process.

The data select screen is a screen for accepting operation of selecting data to be processed and displays first images for identifying data to be processed in a selectable manner.

A plurality of setting screens constitute a hierarchical structure, in which two or more setting screens are associated. As an example of the hierarchical structure, a plurality of setting screens are sorted into a scan process, a copy process, a print process, a data transmission process, a facsimile transmission/reception process, a rotation process, and a deletion process that can be executed by process execution portion 51, and a plurality of setting screens sorted by a plurality of processes are further sorted by the process conditions of the processes, whereby the setting screens sorted into higher to lower levels are arranged. Furthermore, when there are a plurality of process conditions, a plurality of setting screens sorted by process conditions are sorted by levels, and the setting screens sorted into higher to lower levels are arranged. One setting screen may be sorted into a plurality of processes. For example, a setting screen for setting a paper size is sorted into a copy process and a print process.

In order to associate two or more setting screens, the setting screens include a setting screen with the transition function. The setting screen with the transition function has a transition button for selecting one or more other setting screens. When the setting screen with the transition function is displayed on LCD 165, the user operates touch panel 169 or hard key unit 170 to designate the transition button included in the setting screen with the transition function, so that operation screen select portion 13 selects a setting screen associated with the designated transition button. The setting screen also has a transition button for selecting a data select screen. When a setting screen is displayed on LCD 165, the user operates touch panel 169 or hard key unit 170 to designate the transition button for selecting a data select screen, so that operation screen select portion 13 selects a data select screen associated with the designated transition button.

When the user designates one of COPY key 175 and FAX key 177 of hard key unit 170, operation screen select portion 13 specifies a process allocated to the designated key and selects a setting screen arranged on the highest level of one or more setting screens sorted into the specified process among a plurality of setting screens.

Operation screen select screen 13 may display a menu screen for selecting a process and select a setting screen sorted into the process selected by the user in accordance with the menu screen. For example, a menu screen including a plurality of process identification information for identifying plural kinds of processes is displayed on LCD 165, so that the user operates touch panel 169 or hard key unit 170 to designate one of a plurality of process identification information displayed on the menu screen, thereby selecting a setting screen on the highest level that is sorted into the process having the designated process identification information. Furthermore, operation screen select portion 13 may display a menu screen for selecting a setting screen and select a setting screen selected by the user in accordance with the menu screen. For example, a menu screen including a plurality of screen identification information for identifying a plurality of setting screens is displayed on LCD 165, so that the user operates touch panel 169 or hard key unit 170 to designate one of a plurality of screen identification information displayed on the menu screen, thereby selecting a setting screen having the designated screen identification information.

Operation screen select portion 13 includes a mode setting portion 14. A mode will now be explained. The mode refers to a state in which two or more of processes including a scan process, a copy process, a print process, a data transmission process, a facsimile transmission/reception process, a rotation process, and a deletion process are selected. For example, a print process, a data transmission process, and a facsimile transmission/reception process are in common as the function of outputting data, so that an output mode in which these processes are selected can be set. A data transmission process and a facsimile transmission/reception process are in common as the function of outputting data to the outside, so that a transmission mode in which these processes are selected can be set. A rotation process of rotating an image of data and a deletion process of deleting data are in common as the function to be executed on data, so that an edition mode in which these processes are selected can be set. Two or more processes selected as desired by the user from among plural kinds of processes executable by process execution portion 51 may be set in the same mode.

Mode setting portion 14 sets a mode when the user sets a mode. When a mode is set, plural kinds of processes included in the mode become selectable. When BOX key 173 of hard key unit 170 is designated by the user, mode setting portion 14 sets the edition mode allocated to BOX key 173. For example, a mode setting screen for setting a mode is prepared in advance, so that mode setting portion 14 sets a mode designated by the user in accordance with the mode setting screen. For example, a mode setting screen including a plurality of mode identification information for identifying a plurality of modes is displayed on LCD 165, so that the user operates touch panel 169 or hard key unit 170 to designate one of a plurality of mode identification information displayed in the mode setting screen, whereby mode setting portion 14 sets the mode having the designated mode identification information.

When a mode is set by mode setting portion 14, operation screen select portion 13 displays a process select screen for selecting one of plural kinds of processes included in the set mode and selects a setting screen sorted into the process of the kind selected by the user in accordance with the process select screen. For example, a process select screen including a plurality of process identification information for identifying plural kinds of processes included in the set mode is displayed on LCD 165, so that the user operates touch panel 169 or hard key unit 170 to designate one of a plurality of process identification information displayed on the process select screen, thereby selecting a setting screen on the highest level that is sorted into the process having the designated process identification information. The menu screen or the operation screen may include an option for displaying the mode setting screen, or hard key unit 170 may include a key for invoking the mode setting screen.

In the case where a mode is set by mode setting portion 14, a process select screen for selecting one of plural kinds of processes included in the set mode may include a transition key associated with a data select screen. If the transition key associated with the data select screen is designated when the process select screen is being displayed, operation screen select portion 13 selects the data select screen. In this case, even after the data select screen is selected by operation screen select portion 13, the mode set by mode setting portion 14 when the process select screen is displayed is kept. However, in a case where the mode setting screen includes the mode identification information of the edition mode, operation screen select portion 13 selects the data select screen without displaying the process select process when the user designates the mode identification information of the edition mode. In this case, since the edition mode is set by mode setting portion 14, the edition mode set by mode setting portion 14 is kept even after the data select screen is selected by operation screen select portion 13.

Operation screen select portion 13 selects the data select screen when the user designates BOX key 173 of hard key unit 170. When the user designates BOX key 173 of hard key unit 170, the edition mode is set by mode setting portion 14. Operation screen select portion 13 may include, in a plurality of setting screens, a setting screen with the data select function having a transition button to which the data select screen is allocated. When the setting screen with the data select function is displayed on LCD 165, the user operates touch panel 169 or hard key unit 170 to designate the transition button included in the setting screen with the data select function, whereby operation screen select portion 13 selects the data select screen associated with the designated transition button. The screen identification information of the data select screens is displayed in a selectable manner in the menu screen, so that the user designates the screen identification information of the data select screen among a plurality of screen identification information displayed on the menu screen, thereby selecting the data select screen.

Operation screen display portion 15 displays an operation screen specified by screen identification information on LCD 165, in response to screen identification information being input from operation screen select portion 13. Operation screen display portion 15 outputs the screen identification information for identifying the operation screen displayed on LCD 165 to setting accepting portion 19. When a setting screen is identified by the screen identification information input from operation screen select portion 13, operation screen display portion 15 reads out the setting screen specified by the screen identification information from HDD 115 and outputs the read setting screen to display control portion 161 to allow display control portion 161 to display an image of the setting screen on LCD 165.

In the case where the operation screen specified by the screen identification information input from operation screen display portion 15 is a setting screen, setting accepting portion 19 accepts a setting value input by the user to operation panel 160 in accordance with the setting screen and outputs the accepted setting value for each setting item to process execution portion 51. When any one of one or more setting areas included in the setting screen is selected by the user, setting accepting portion 19 displays an input screen superimposed on the setting screen. The input screen includes a plurality of input keys. A value allocated to each of a plurality of input keys is given a key name. For example, the input screen includes ten input keys to which numerals 0 to 9 are allocated. The input screen is not limited to the screen including ten input keys having numerals 0 to 9 and may be a screen including 26 input keys to which letters of the alphabet are allocated or including a plurality of keys to which Japanese characters are allocated. Setting accepting portion 19 accepts a setting value based on the input key designated by the user among a plurality of input keys included in the input screen.

When the user designates with a finger any one of a plurality of images with key names included in the input screen displayed on LCD 165, touch panel 169 detects the position designated by the user. Setting value accepting portion 19 specifies which of a plurality of images with key names included in the input screen is designated by the user, based on the coordinates of the display surface of LCD 165 as detected by touch panel 169, and selects the input key corresponding to the image with the specified key name. Setting accepting portion 19 sets the value allocated to the selected input key as a setting value in the setting item corresponding to the setting area previously selected by the user and outputs a set of the setting item and the setting value to process execution portion 51. In a case where a plurality of input keys included in the input screen are successively designated, setting accepting portion 19 accepts, as a setting value, a value obtained by arranging a plurality of values allocated to a plurality of input keys in the selected order. For example, in the case where numerals "0" to "9" are allocated to ten input keys, when the input key with a numeral "1" is selected in the first place and the input key with a numeral "2" is selected in the second place, a setting value "12" is determined and accepted, in which "2" selected in the second place is arranged to the right of "1" selected in the first place. In the case where alphabets are allocated to the respective 26 input keys, a string of characters arranged in the input order is accepted as a setting value.

The data select screen is a screen for accepting operation of selecting data to be processed and displays first images for identifying data to be processed in a selectable manner. The data select screen includes a first layer configured with a back ground part and a second layer configured with a data select part in which one or more first images are arranged. The back ground part is a predetermined image stored in HDD 115. When the data select screen is identified by the screen identification information input from operation screen select portion 13, operation screen display portion 15 reads out the back ground part on the first layer of the data select screen from HDD 115 and outputs the read back ground part to display control portion 161 to allow display control portion 161 to display an image of the back ground part on LCD 165.

Operation screen display portion 15 includes a first image display portion 17. When the operation screen specified by the screen identification information input from operation screen select portion 13 is the data select screen, first image display portion 17 generates a data select part in which one or more first images for identifying one or more data are arranged, and displays the data select part that is the second layer superimposed on the back ground part on the first layer displayed on LCD 165. The first image is an image for identifying data and is a reduced image of the image of the data. The first image may be a thumbnail image or an image associated with data in advance. The first image is preferably rectangular. The first image may be shaped like a rounded rectangle. The first image may be shaped like a polygon having a horizontal length and a vertical length.

For example, it is assumed that the data select screen specified by the screen identification information input from operation screen select portion 13 is a screen for selecting data stored in a predetermined storage area of a plurality of storage areas of HDD 115. First image display portion 17 generates a data select part in which one or more first images for identifying one or more data stored in a predetermined storage area of HDD 115 are arranged, and displays the data select part that is the second layer superimposed on the back ground part on the first layer displayed on LCD 165. When a plurality of data are stored in a predetermined storage area of HDD 115, first image display portion 17 generates a data select part by arranging a plurality of first images for identifying a plurality of data at a predetermined distance from each other such that they are not overlapped. The predetermined distance is preferably longer than the horizontal length of the second image as described later.

The data select part may have a size larger than the back ground part. In this case, first image display portion 17 successively selects a part having the same size as the back ground part from the data select part and displays the selected part on LCD 165. The data select part is divided into a plurality of pages having the same size as the back ground part and is displayed page by page on LCD 165. When the data select part has a size larger than the back ground part, first image display portion 17 accepts scroll operation or page up/down operation from the user and thereby successively selects the part having the same size as the back ground part displayed on LCD 165 from the data select part or selects a page having the same size as the back ground part and displays the selected part or page on LCD 165.

The data select part on the second layer is transparent, excluding where the first images are displayed. On LCD 165, the image of the data select part on the second layer is displayed on the back ground part on the first layer. When the data select part has a size larger than the back ground part, scroll operation or page up/down operation is input so that only the data select part is scrolled or paged up/down and is displayed with the back ground part kept the same.

First image display portion 17 outputs one or more first image information related to one or more first images arranged in the data select part to process specifying portion 21. Each first image information includes data identification information of data identified by the first image and area information indicating the position of the first image in LCD 165.

Process specifying portion 21 receives screen identification information from operation screen select portion 13. When the operation screen identified by the screen identification information input from operation screen select portion 13 is the data select screen, process specifying portion 21 receives one or more first image information from first image display portion 17. When the operation screen displayed on LCD 165 is the data select screen, process specifying portion 21 selects process target data to be processed from among one or more data displayed in a selectable manner on the data select screen and specifies an execution process to be executed on the data to be processed.

Process specifying portion 21 includes a data select portion 23 for selecting process target data, an executable process decision portion 25 for deciding an executable process that can be executed on the process target data, a second image display portion 27, a clone image display portion 29, a clone image moving portion 31, a candidate process decision portion 33, and an execution process decision portion 35 for deciding an execution process.

Data select portion 23 selects the data selected by the user in accordance with the data select screen displayed on LCD 165, as process target data. When process target data is selected, data select portion 23 outputs data identification information for identifying process target data to clone image display portion 29, executable process decision portion 25, and process execution portion 51.

Specifically, when any one of the one or more first images displayed on LCD 165 is designated by the user continuously for a predetermined time, data select portion 23 selects data identified by the first image designated by the user as process target data. The positions in the data select screen of the one or more first images included in the data select screen are defined by the first image information. The position designated by the user in the data select screen is detected by touch panel 169. Data select portion 23 selects process target data based on the first image information input from first image display portion 17 and the position designated by the user as detected by touch panel 169. When a position in the area in which any one of the one or more first images displayed on LCD 165 is displayed is detected by touch panel 169 continuously for a predetermined time, data select portion 23 selects the data identified by the first image displayed at the position detected by touch panel 169, as process target data.

When a predetermined position of any one of the one or more first images displayed on LCD 165 is designated by the user, data select portion 23 may select data identified by the first image designated by the user as process target data. The predetermined position of the first image may be set within a predetermined section in the first image, for example, within a range at a predetermined distance from the center of the first image.

When process target data is selected, data select portion 23 makes a display manner of the first image corresponding to the selected process target data differ from the display manner of the other first images. For example, the brightness of the first image corresponding to the process target data is set higher than the brightness of the other first images. Alternatively, the size of the first image corresponding to the process target data is made larger than the size of the other first images. Accordingly, the user is notified that the first image corresponding to the process target data is selected.

Executable process decision portion 25 decides an executable process that can be executed on the data specified by the data identification information, in response to the data identification information being input from data select portion 23. When there exist a plurality of processes that can be executed on the data, executable process decision portion 25 decides a plurality of processes as executable processes. Preferably, when there exist a plurality of processes that can be executed on the data, executable process decision portion 25 decides two as executable processes from among a plurality of processes. Executable process decision portion 25 outputs process identification information for identifying the executable process to second image display portion 27. The executable process decided by executable process decision portion 25 includes a mode including a plurality of executable processes. Therefore, when executable process decision portion 25 decides a mode as an executable process, the process identification information output by executable process decision portion 25 to second image display portion 27 includes the mode identification information for identifying the mode including a plurality of processes.

In a case where a preset process is defined as an executable process among plural kinds of processes that can be executed by process execution portion 51, executable process decision portion 25 decides the preset process as an executable process. For example, when a print process and a data transmission process are defined as executable processes among plural kinds of processes, the print process and the data transmission process are decided as executable processes.

In a case where a preset process is not defined as an executable process, if a mode is set by mode setting portion 14, executable process decision portion 25 decides plural kinds of processes included in the set mode as executable processes. Specifically, when the output mode is set, a print process and a transmission process are decided as executable processes. When the transmission mode is set, a data transmission process and a facsimile transmission/reception process are decided as executable processes. When the edition mode is set, a rotation process and a deletion process are decided as executable processes. This is effective in a case where the upper limit of executable processes is set to two.

In a case where three or more executable processes can be set, when the output mode is set, a print process, a data transmission process, and a facsimile transmission/reception process are decided as executable processes.

When a user selection mode is set, in which two or more selected by the operating user as desired from among plural kinds of processes are defined, executable process decision portion 25 decides two or more processes selected by the operating user that are included in the user selection mode, as executable processes.

Even in the case where a preset process is defined as an executable process, if a mode is set by mode setting portion 14, executable process decision portion 25 may decide plural kinds of processes included in the set mode as executable processes.

In a case where a preset process is not defined as an executable process and where a mode is not set by mode setting portion 14, executable process decision portion 25 decides a predetermined number of processes as executable processes in the order of execution frequency, from among plural kinds of processes that can be executed by process execution portion 51. The history of processes executed by process execution portion 51 is stored, and the number of times of execution is counted for each of plural kinds of processes based on the history. Then, a predetermined number of processes are selected in the order of execution counts, and a predetermined number of selected processes are decided as executable processes. The predetermined number is a number determined in advance and can be set to any number.

Even in the case where a preset process is defined as an executable process or in the case where a mode is set by mode setting portion 14, executable process decision portion 25 may decide a predetermined number of processes as executable processes in the order of execution frequency, from among plural kinds of processes that can be executed by process execution portion 51.

Second image display portion 27 receives data identification information from data select portion 23 and receives process identification information from executable process decision portion 25. Second image display portion 27 displays a second image for identifying an executable process specified by the process identification information at a position defined based on the position where the first image for identifying data specified by the data identification information is arranged in the data select part of the data select screen. Since the data select part on the second layer is superimposed on the back ground part on the first layer displayed on LCD 165, the second image is arranged at a position defined based on the first image and is displayed on LCD 165. When the process identification information is mode identification information, the second image for identifying the mode identification information is arranged in the data select screen.

When one or more second images are displayed, second image display portion 27 outputs one or more second image information related to one or more second images arranged in the data select part to candidate process decision portion 33. Each second image information includes process identification information of the process specified by the second image and area information indicating the position of the second image in LCD 165.

The second image is a thumbnail image determined in advance corresponding to an executable process. For example, the second image corresponding to a print process that is one of executable processes is an image depicting a printer. The second image corresponding to a data transmission process that is one of executable processes is an image depicting a document being transmitted.

When one process identification information is input from executable process decision portion 25, second image display portion 27 arranges and displays the second image corresponding to the process identification information above the first image for identifying the data specified by the data identification information. When two process identification information are input from executable process decision portion 25, second image display portion 27 arranges two second images corresponding to the two process identification information above the position where the first image is arranged. Preferably, second image display portion 27 arranges two second images above the position where the first image is arranged, such that they are aligned in the horizontal direction at a distance longer than the horizontal length of the first image. When three or more process identification information are input from executable process decision portion 25, second image display portion 27 arranges three or more second images corresponding to the three or more process identification information, in directions other than the downward direction from the position where the first image is displayed, and at positions where three or more of the three or more second images are not aligned in a straight line.

Clone image display portion 29 arranges a clone image that is a copy image of the first image corresponding to process target data in the data select part on the second layer, in response to data identification information being input from data select portion 23. At the point of time when data identification information is input from data select portion 23, the position designated by the user has been detected by touch panel 169. Clone image display portion 29 arranges the clone image at a position defined based on the position detected by touch panel 169. For example, the clone image is displayed at a position where the center of the clone image overlaps the position detected by touch panel 169. The clone image corresponding to the first image is thus displayed on LCD 165. The clone image is a copy image of the first image and partially includes a transparent portion. Therefore, in the back ground part on the first layer and the data select part on the second layer of the data select screen, the part that overlaps the clone image is displayed so as to be seen through the clone image, so that the user can visually recognize the part that overlaps the clone image. With the clone image being displayed, the user can know that the first image corresponding to the process target data is selected. In response to the clone image being displayed, clone image display portion 29 outputs a signal indicating the clone image has been displayed to clone image moving portion 31.

Clone image moving portion 31 arranges the clone image at a position defined based on the position detected by touch panel 169 while the position designated by the user is being detected by touch panel 169 after the signal indicating that the clone image has been displayed is input from clone image display portion 29. For example, the clone image is displayed at a position where the center of the clone image overlaps the position detected by touch panel 169. Every time the position detected by touch panel 169 is changed, clone image moving portion 31 arranges the clone image at the changed position. Therefore, if the user changes the position designated on touch panel 169, the position where the clone image is displayed is moved with the change of the position designated by the user. Clone image moving portion 31 outputs a signal indicating that the clone image is being displayed to candidate process decision portion 33 while the position designated by the user is being detected by touch panel 169.

Candidate process decision portion 33 detects a relative positional relation between a clone image and each of the one or more second images displayed by second image display portion 27, while the signal indicating the clone image is being displayed is being input from clone image moving portion 31. When the clone image at least partially overlaps one of the one or more second images, candidate process decision portion 33 determines that, of the one or more second images, the second image overlapped with the clone image and the clone image fall into a predetermined relative positional relation. Candidate process decision portion 33 decides the process identified by the second image overlapped with the clone image as a candidate process, among the one or more second images. While deciding a candidate process, candidate process decision portion 33 outputs the process identification information of the candidate process to executable process decision portion 35 and second image display portion 27.

Candidate process decision portion 33 decides the process corresponding to the second image overlapped with the clone image as a candidate process, while the clone image is at least partially overlapping one of the one or more second images. While the user is moving the clone image, the clone image may change from the state in which it overlaps one of the one or more second images to the state in which it does not overlap, and thereafter may at least partially overlap another second image. In this case, candidate process decision portion 33 decides the process identified by one second image as a candidate process during the state in which the clone image is overlapping one second image, does not decide a candidate process during the state in which the clone image does not overlap any of the one or more second images, and decides the process identified by another second image as a candidate process during the state in which the clone image is overlapping another second image.

Candidate process decision portion 33 may decide the second image arranged in the direction in which the clone image is moved, as a candidate process, among the one or more second images. When the user is moving the clone image, a state in which the direction in which the clone image is moved is toward one of the one or more second images may change to a state in which it is toward another second image. In this case, candidate process decision portion 33 decides the process identified by one second image as a candidate process during the state in which the direction in which the clone image is moved is toward one second image among the one or more second images, and candidate process decision portion 33 decides the process identified by another second image as a candidate process during the state in which the direction in which the clone image is moved is toward another second image.

Second image display portion 27 includes an enlargement portion 43 and an identification information display portion 45. Enlargement portion 43 enlarges the size of the second image specified by the process identification information while the process identification information of the candidate process is being input from candidate process decision portion 33. Accordingly, among the one or more second images, the second image decided as a candidate process is displayed in an enlarged size thereby to notify the user which of the one or more second images is selected. The user thus can recognize that the process corresponding to the second image is to be selected.

Identification information display portion 45 displays process identification information in the vicinity of the second image specified by the process identification information while the process identification information of the candidate process is being input from candidate process decision portion 33. Accordingly, the user can recognize that the process having the process identification information is to be selected. The process identification information is preferably the name of the process. The position where the process identification information is displayed is preferably in the area adjacent to the second image specified by the process identification information, either on the right or left, or below or above. The position where the process identification information is displayed may be within the second image.

Execution process decision portion 35 decides the candidate process as an execution process to be executed on the process target data when the position designated by the user is no longer detected by touch panel 169 while the process identification information of the candidate process is being input from candidate process decision portion 33. When an execution process is decided, execution process decision portion 35 outputs the process identification information for identifying the execution process to operation screen select portion 13.

Operation screen select portion 13 displays an operation screen on LCD 165 as described above. In response to the process identification information being input from execution process decision portion 35 when the data select screen is being displayed, operation screen select portion 13 displays a setting screen corresponding to the process specified by the process identification information on LCD 165. The user inputs a setting value in accordance with the setting screen, whereby a setting value for each item is output to process execution portion 51 as a process condition for process execution portion 51 to execute the execution process. When the process identification information is mode identification information, operation screen select portion 13 displays a process select screen corresponding to the mode identification information on LCD 165.

Process execution portion 51 receives data identification information from data select portion 23 and receives a process condition from setting accepting portion 19. Process execution portion 51 sets the data specified by the data identification information input from data select portion 23 as process target data and executes the process in accordance with the process condition input from setting accepting portion 19.

When an execution process is decided, execution process decision portion 35 may output the process identification information for identifying the execution process to process execution portion 51 to allow process execution portion 51 to execute the process specified by the process identification information. In this case, process execution portion 51 may execute the process specified by the process identification information on the data specified by the data identification information input from data select portion 23 in accordance with process conditions defined by default.

Figure 5:
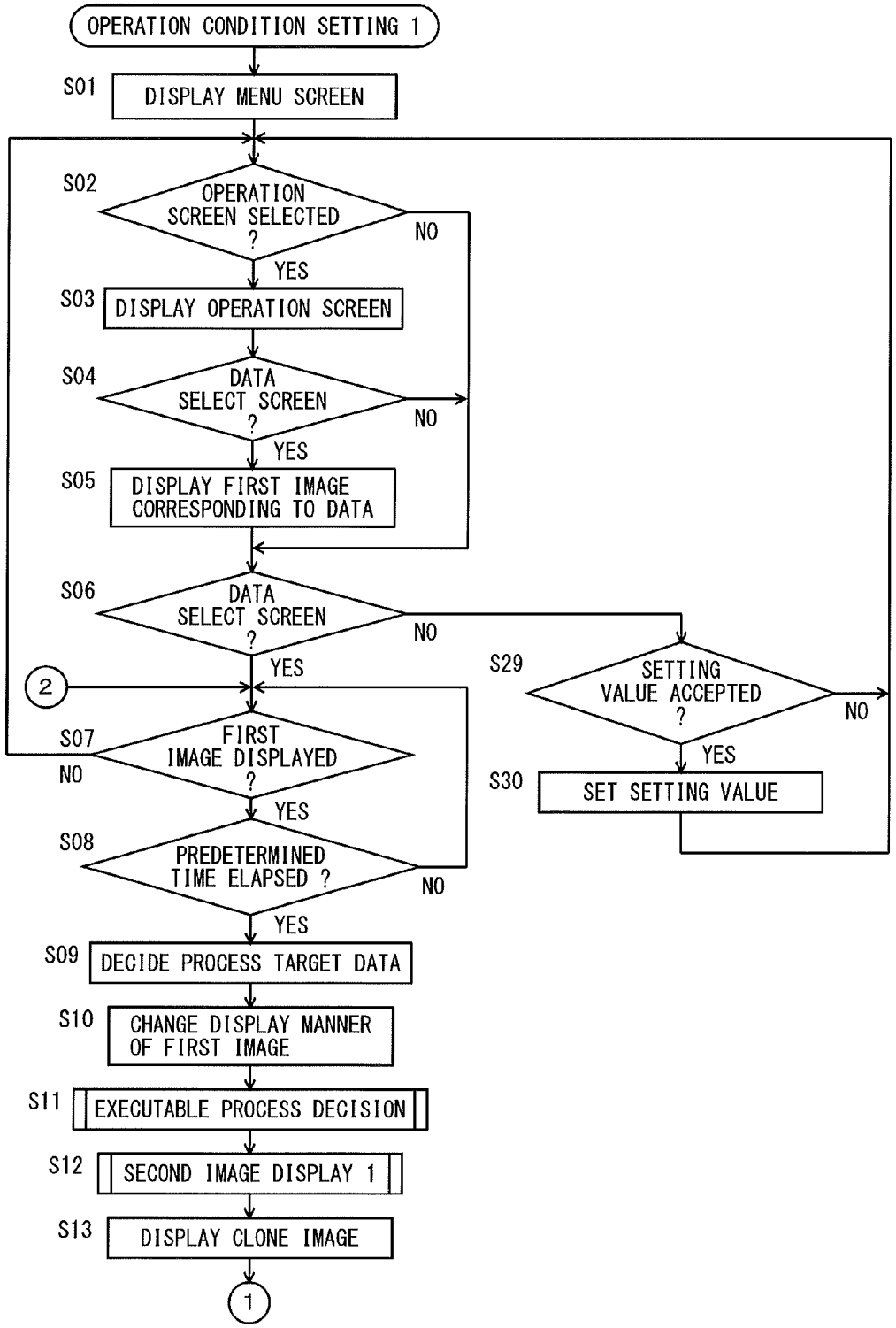
FIG. 5 is a first flowchart showing an exemplary flow of an operation condition setting process in the first embodiment.
Figure 6:
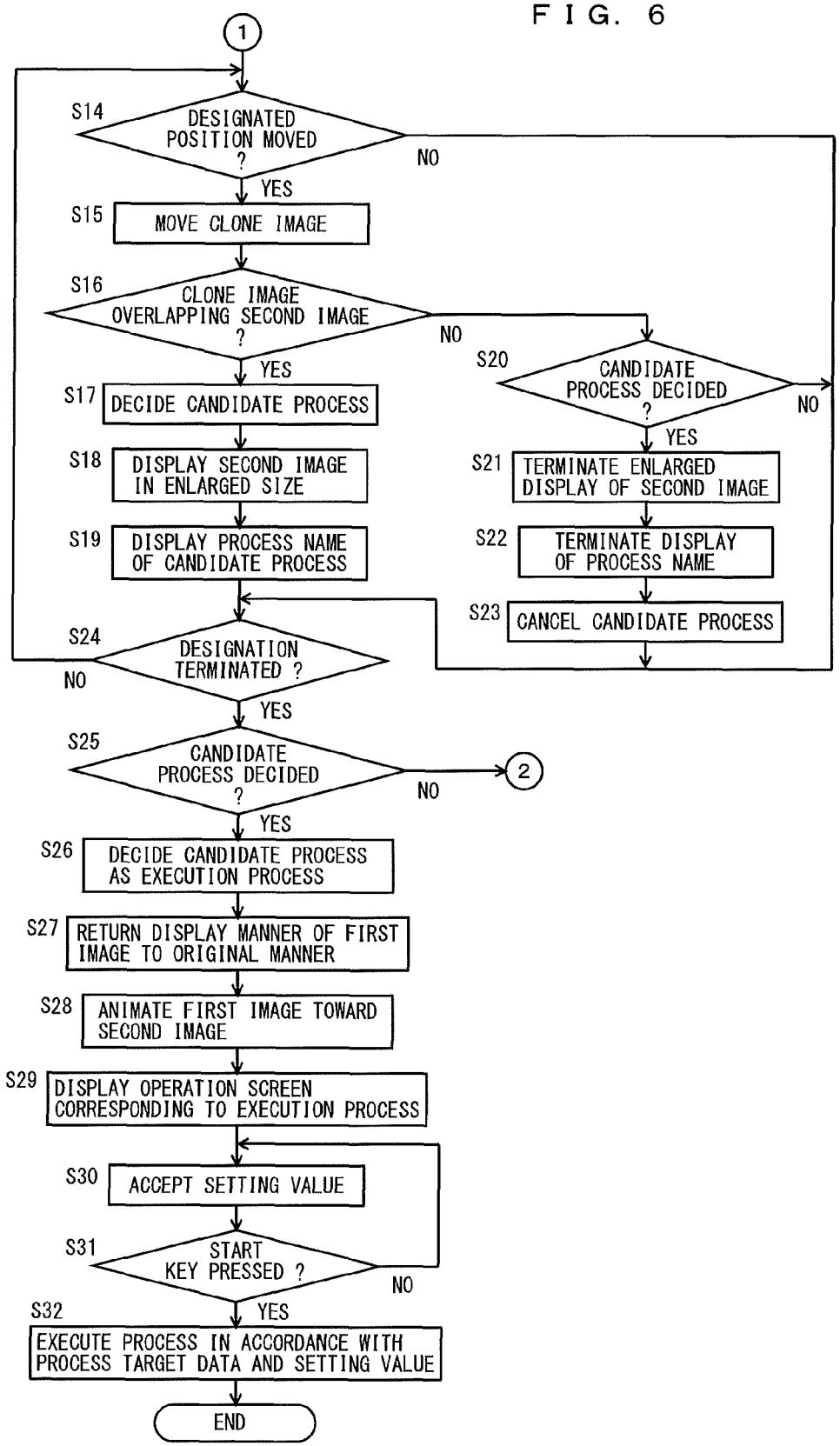
FIG. 6 is a second flowchart showing an exemplary flow of the operation condition setting process in the first embodiment.

FIG. 5 and FIG. 6 are flowcharts showing an exemplary flow of an operation condition setting process in the first embodiment. The operation condition setting process is a process executed by CPU 111 by CPU 111 of MFP 100 executing a setting program stored in ROM 113, HDD 115, or CD-ROM 118. Referring to FIG. 5 and FIG. 6, CPU 111 displays a menu screen on LCD 165 (step S01). For example, the menu screen is an operation screen defined by default.

In the next step S02, it is determined whether an operation screen is selected. It is determined that an operation screen is selected if the user selects one of a plurality of screen identification information included in the menu screen in the state in which the menu screen is displayed on LCD 165, or if the user selects the transition button in the state in which the operation screen with the transition function is displayed on LCD 165. If an operation screen is selected, CPU 111 proceeds to step S03. If not, CPU 111 proceeds to step S05.

In step S03, the selected operation screen is displayed on LCD 165. When the user selects one of a plurality of screen identification information in the state in which the menu screen is displayed on LCD 165, the operation screen specified by the selected screen identification information is displayed on LCD 165. When the user selects the transition button in the state in which the operation screen with the transition function is displayed on LCD 165, the operation screen specified by the screen identification information allocated to the transition button is displayed on LCD 165.

In step S04, it is determined whether the operation screen displayed on LCD 165 is the data select screen. If the data select screen is displayed on LCD 165, the process proceeds to step S05. If not, the process proceeds to step S06. In step S05, the first image corresponding to the data is displayed. Specifically, the back ground part of the data select screen is displayed in step S03. The data select screen is a screen that displays data stored in HDD 115 in a selectable manner. Therefore, in step S05, the data select part is generated, in which one or more first images for identifying one or more data stored in an area specified by the data select screen among a plurality of storage areas of HDD 115 are arranged. The data select part on the second layer superimposed on the back ground part on the first layer displayed on LCD 165 is then displayed. If the data select part has a size larger than the back ground part, a part of the data select part is successively selected, and the selected part is displayed on LCD 165. Scroll operation by the user is accepted, whereby the part to be displayed on LCD 165 is successively selected from the data select part, and the selected part is displayed on LCD 165.

In step S06, similar to step S04, it is determined whether the operation screen displayed on LCD 165 is the data select screen. If the data select screen is displayed on LCD 165, the process proceeds to step S07. If not, the process proceeds to step S29.

In the next step S07, it is determined whether the first image is designated. If one or more first images displayed on LCD 165 are designated (YES in step S07), the process proceeds to step S08. If not, the process returns to step S02. In step S08, it is determined whether the time elapsed since the first image is designated in step S07 reaches a predetermined time. If a predetermined time has elapsed since the first image is designated, the process proceeds to step S09. If not, the process returns to step S07. The process may proceed to step S09 if an area within a predetermined range from the center of the first image is designated in step S07.

In step S09, the data specified by the first image designated in step S07 is decided as process target data. The process then proceeds to step S10. In step S10, the display manner of the first image designated in step S07 is changed. Here, the brightness of the first image is changed to a higher value. An executable process decision process is then executed. The process then proceeds to step S12. The executable process decision process, which will be detailed later, is a process of deciding a process that can be executed by MFP 100 on the process target data. Here, a print process and a data transmission process are determined in advance as executable processes, by way of example.

In step S12, a second image display process is executed. The process then proceeds to step S13. The second image display process, which will be detailed later, is a process of displaying the second image for identifying an executable process at a position defined based on the position where the first image is displayed.

In step S13, a clone image that is a copy image of the first image is displayed on LCD 165. The process then proceeds to step S14. The position where the clone image is displayed is the position where the center of the clone image overlaps the position detected by touch panel 169. The clone image is a copy image of the first image and is at least partially transparent. Therefore, the back ground part on the first layer can be displayed so as to be visually recognized by the user through the transparent portion of the clone image.

In step S14, it is determined whether the designated position is moved. It is determined that the designated position is moved if the position detected by touch panel 169 is changed since the clone image is displayed in step S13 by designating the first image in step S07. If it is determined that the designated position is moved, the process proceeds to step S15. If not, the process proceeds to step S24. In step S15, the position where the clone image is displayed is moved. Specifically, the clone image is displayed at the position where the center of the clone image overlaps the position detected by touch panel 169.

In the next step S16, it is determined whether the clone image overlaps any one of the one or more second images. If at least part of the clone image overlaps any one of the one or more second images, the process proceeds to step S17. If not, the process proceeds to step S20.

In step S17, a candidate process is decided. The process corresponding to the second image that is overlapped with the clone image among the one or more second images is decided as a candidate process. The second image corresponding to the candidate process is then displayed in an enlarged size (step S18). With the second image being displayed in an enlarged size, the user is notified that the second image is being selected. In addition, the process name of the process corresponding to the second image is displayed adjacent to the second image (step S19). The process then proceeds to step S24. Here, the process name is displayed below the second image. With the process name being displayed below the second image, the user is notified of the selected process.

On the other hand, when the process proceeds to step S20, step S17 may be executed earlier, and a candidate process may have been decided. This is the case where the user moves the clone image to the position where the clone image overlaps any one of the one or more second images, and the user thereafter moves the clone image to a position where it does not overlap any of the one or more second images. In step S20, it is determined whether a candidate process has been decided. If a candidate process has been decided, the process proceeds to step S21. If not, the process proceeds to step S24. In step S21, the enlarged display of the second image is terminated. The second image displayed in an enlarged size by executing step S18 is displayed in the original size. The display of the process name is then terminated (step S22). The display of the process name displayed by executing step S19 is terminated. In step S23, the candidate process decided in step S17 is cancelled. The process then proceeds to step S24.

In step S24, it is determined whether the designation is terminated. It is determined that the designation is terminated if the position detected by touch panel 169 is no longer detected. If the designation is terminated, the process proceeds to step S25. If not, the process returns to step S14.

When the process proceeds to step S25, a candidate process may have been decided by executing step S17. In step S25, it is determined whether a candidate process has been decided. If a candidate process has been decided, the process proceeds to step S26. If not, the process returns to step S07. In step S26, the candidate process is decided as an execution process. The process then proceeds to step S27. In step S27, the display manner of the first image is returned to the original manner. The process then proceeds to step S28. When the process proceeds to step S27, the display manner of the first image has been changed in step S10.

In step S28, the first image is animated toward the second image. Specifically, a clone image that is a copy of the first image designated in step S07 is moved from the position of the first image toward the position of the second image corresponding to the execution process decided in step S27. At the point of time when the clone image overlaps the second image, termination of the display of the clone image is displayed. Furthermore, the clone image is displayed so as to be gradually reduced such that the clone image becomes smaller as it moves from the first image to the second image. Accordingly, the user is notified by animation that the execution process specified by the second image is being executed on the data specified by the first image.

In the next step S29, the operation screen corresponding to the execution process decided in step S27 is displayed on LCD 165. The process then proceeds to step S30. The operation screen corresponding to the execution process is a setting screen for setting a process condition for allowing MFP 100 to execute the execution process. The user is thus allowed to set a setting value in accordance with the setting screen appearing on LCD 165.

In the next step S30, the setting value input by the user to operation panel 160 is accepted. It is then determined whether the start key of operation panel 160 is pressed (step S31). If the start key is pressed, the process proceeds to step S32. If not, the process returns to step S30.

In step S32, the execution process is executed on the process target data decided in step S09 in accordance with the setting value set in step S30. The process then ends.

Figure 7:
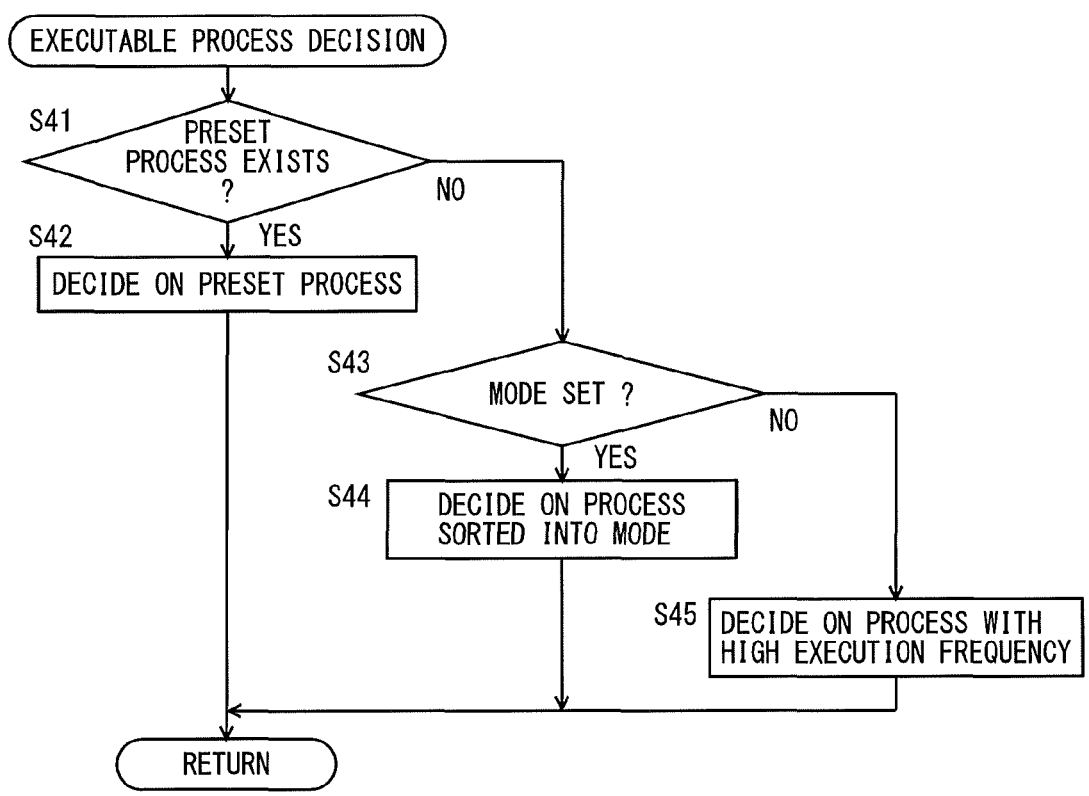
FIG. 7 is a flowchart showing an exemplary flow of an executable process decision process.

FIG. 7 is a flowchart showing an exemplary flow of the executable process decision process. The executable process decision process is a process executed in step S11 in the operation condition setting process shown in FIG. 5. Referring to FIG. 7, CPU 111 determines whether a preset process is defined as an executable process (step S41). If a preset process is defined, the process proceeds to step S42. If not, the process proceeds to step S43. In step S42, two preset processes are decided as executable processes. The process then returns to the operation condition setting process. For example, a print process and a data transmission process can be defined as two preset processes that can be set as executable processes.

In step S43, it is determined whether a mode is set. If a mode is set, the process proceeds to step S44. If not, the process proceeds to step S45. The mode is set by the operating user designating a mode. When BOX key 173 of hard key unit 170 is designated by the operating user, the edition mode is set. If the user operates touch panel 169 or hard key unit 170 to designate any one of a plurality of mode identification information displayed on the mode setting screen when the mode setting screen is being displayed on LCD 165, the mode having the designated mode identification information is set.

In step S44, the process sorted into the set mode is decided as an executable process. The process then returns to the operation condition setting process. Specifically, when the output mode is set, a print process, a data transmission process, and a facsimile transmission/reception process are decided as executable processes. When the transmission mode is set, a data transmission process and a facsimile transmission/reception process are decided as executable processes. When the edition mode is set, a rotation process and a deletion process are decided as executable processes.

In step S45, a predetermined number of highest processes are decided as executable processes from among the processes with high execution frequency. The process then returns to the operation condition setting process. The history of processes executed in MFP 100 is stored, and the number of times of execution is counted for each of plural kinds of processes that can be executed by MFP 100. Then, a predetermined number of processes are selected in the order of execution count, and a predetermined number of selected processes are decided as executable processes. The predetermined number is a number determined in advance and can be set to any number.

Figure 8:
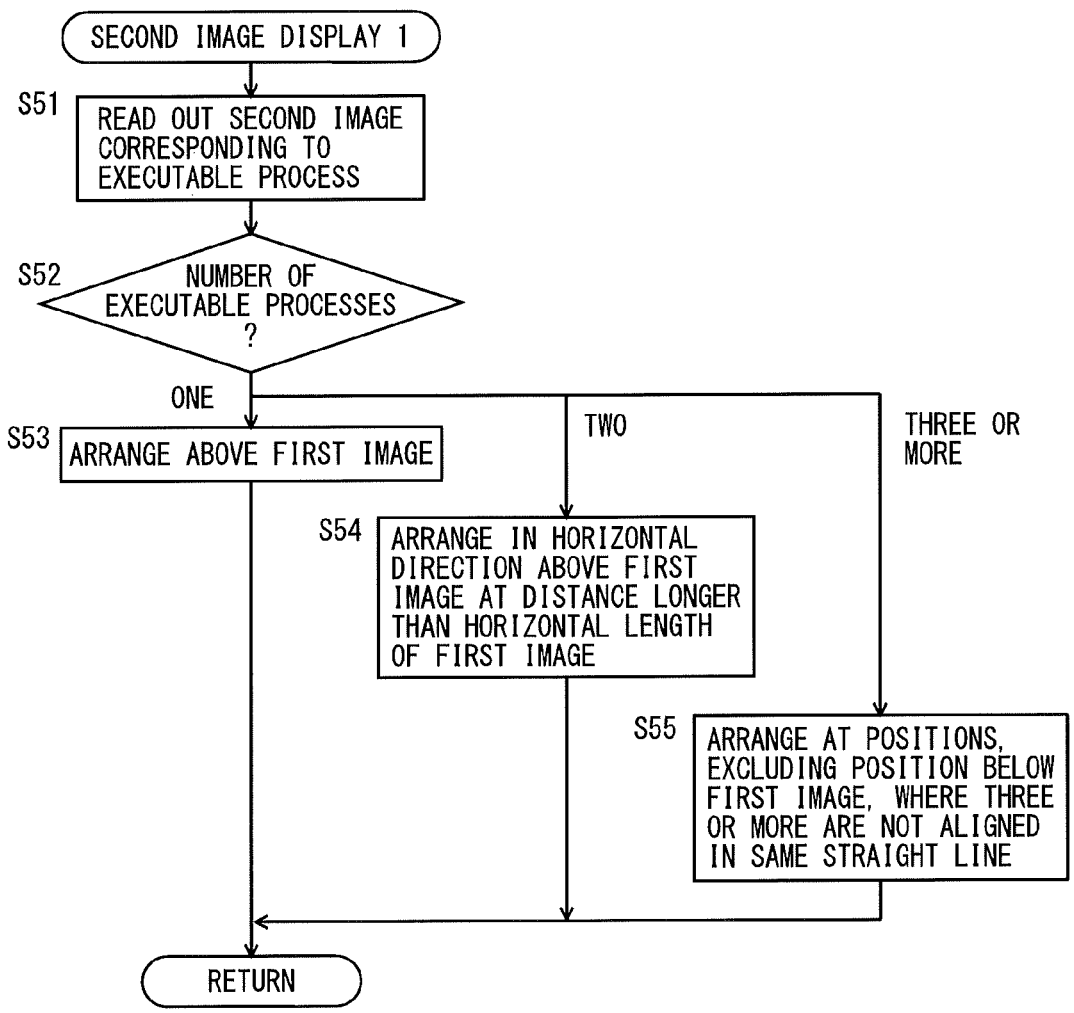
FIG. 8 is a flowchart showing an exemplary flow of a second image display process.

FIG. 8 is a flowchart showing an exemplary flow of the second image display process. The second image display process is a process executed in step S12 in the operation condition setting process shown in FIG. 5. In the operation condition setting process, process target data is decided in step S09, and an executable process is decided in step S11, before step S12 is executed. Referring to FIG. 8, the second image corresponding to the executable process is read out from HDD 115 (step S51). If a plurality of executable processes have been decided, a plurality of second images corresponding to a plurality of executable processes are read out from HDD 115.

In step S52, the process branches depending on the number of executable processes. If there is one executable process, the process proceeds to step S53. If there are two executable processes, the process proceeds to step S54. If there are three or more executable processes, the process proceeds to step S55.

In step S53, one second image is displayed above the first image, and the process returns to the operation condition setting process. In step S54, two second images are displayed above the first image in the horizontal direction at a distance longer than the horizontal length of the first image, and the process returns the operation condition setting process. In step S55, three or more second images are arranged and displayed in directions other than the downward direction from the first image, at positions where three or more of the three or more second images are not aligned in the same straight line. The process then returns to the operation condition setting process.

Figure 9:
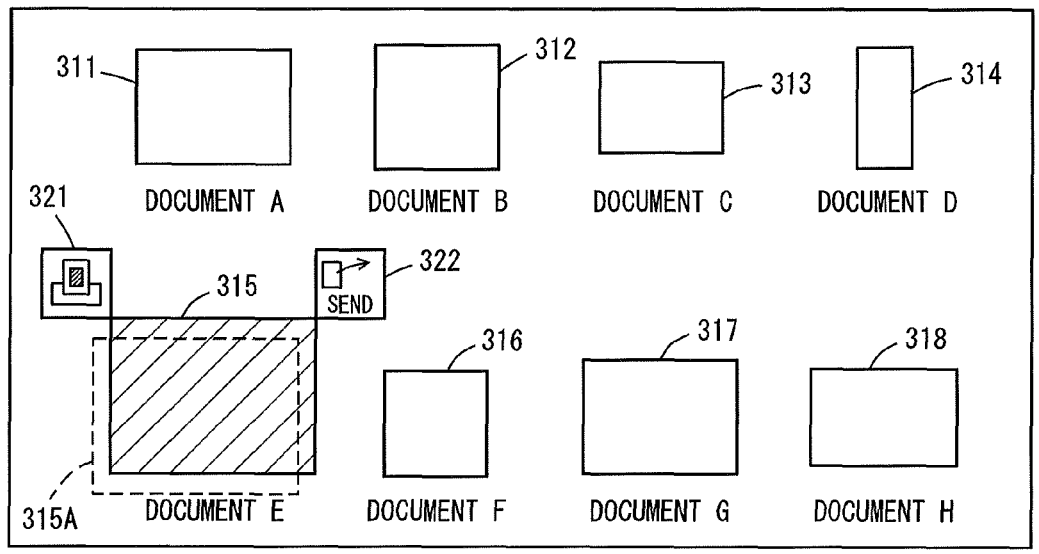
FIG. 9 is a first diagram showing an example of a data select screen.

FIG. 9 is a first diagram showing an example of the data select screen. Referring to FIG. 9, a data select screen 301 includes eight first images 311 to 318 corresponding to eight data. Below first images 311 to 318, the respective document names as data identification information of the corresponding data, namely, a document A to a document H are arranged. FIG. 9 shows a state in which first image 315 is designated by the user. First image 315 is hatched in the figure to indicate that first image 315 is displayed with a brightness higher than the other first images 311 to 314 and 316 to 318. Accordingly, the user is notified that first image 315 is being selected. A clone image 315A of first image 315 is shown with a rectangular dotted line for the sake of illustration. Clone image 315A is a copy image of first image 315 and is partially transparent.

Two second images 321 and 322 are arranged outside of first image 315. Second image 321 is an image corresponding to a print process and depicting a printer. Second image 322 is an image corresponding to a data transmission process and depicting a document being transmitted. The two second images 321 and 322 are arranged above the position where first image 315 is arranged, such that they are aligned in the horizontal direction at a distance longer than the horizontal length of first image 315.

The two second images 321 and 322 are arranged above the position where the first image 315 is arranged, thereby preventing the two second images 321 and 322 from being hidden under the user's finger or hand and becoming out of sight during the operation of moving clone image 315A. The two second images 321 and 322 are arranged so as to be aligned in the horizontal direction at a distance longer than the horizontal length of first image 315, thereby preventing clone image 315A from overlapping the two second images 321 and 322 at the same time. Therefore, the operation of overlaying clone image 315A onto any one of second images 321 and 322 becomes easy.

Figure 10:
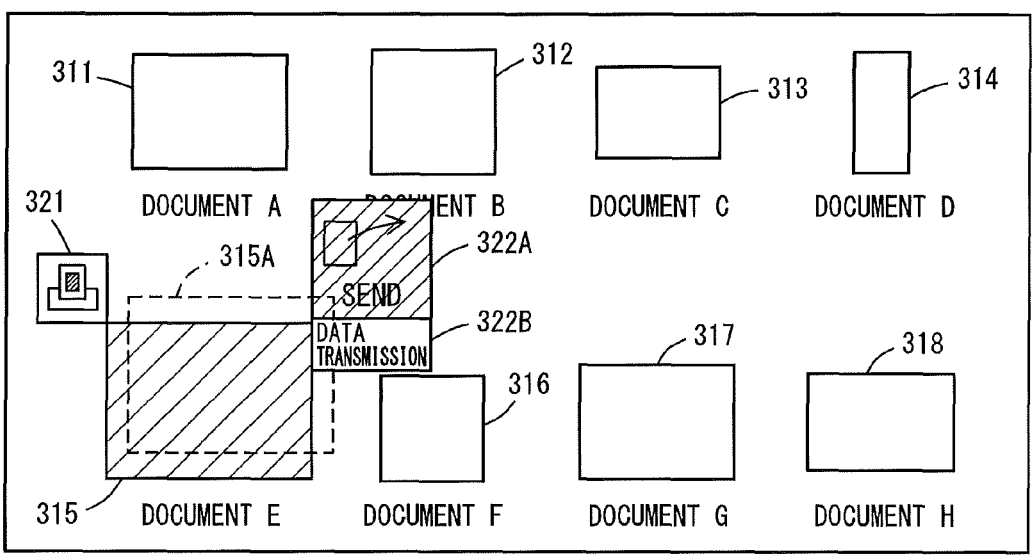
FIG. 10 is a second diagram showing an example of the data select screen.

FIG. 10 is a second diagram showing an example of the data select screen. FIG. 10 shows a state in which the user moves clone image 315A such that clone image 315A partially overlaps second image 322 in data select screen 301 shown in FIG. 9.

Referring to FIG. 10, a second image 322A is displayed in an enlarged size. Second image 322A is hatched in the figure to indicate that second image 322A is displayed with a higher brightness than second image 322 shown in FIG. 9. Clone image 315A partially overlaps second image 322A. In addition, an area 322B is arranged below second image 322A to display "data transmission" that is the name of the data transmission process corresponding to second image 322A.

Second image 322A is displayed in an enlarged size and with a higher brightness, and the name of the data transmission process is additionally displayed, thereby to indicate to the operating user that the data transmission process corresponding to second image 322A is selected.

FIG. 11 is a diagram illustrating the arrangement of three or more second images. Referring to FIG. 11, five second images 341 to 345 are arranged for a first image 331, by way of example. Second images 341 to 345 are arranged in directions other than the downward direction from the position where first image 331 is arranged, at positions where three or more of the five second images 341 to 345 are not aligned in a straight line. Second images 341 to 345 are arranged above the center of first image 331.

Second images 341 to 345 are arranged in directions other than the downward direction from the position where first image 331 is arranged, thereby preventing second images 341 to 345 from being hidden under the user's finger or hand and becoming out of sight.

The clone image of first image 331 can be moved upward from the position of first image 331 to overlap second image 343. The clone image of first image 331 can be moved rightward from the position of first image 331 to overlap second image 345. The clone image of first image 331 can be moved leftward from the position of first image 331 to overlap second image 341. The clone image of first image 331 can be moved toward the upper right from the position of first image 331 to overlap second image 344. The clone image of first image 331 can be moved toward the upper left from the position of first image 331 to overlap second image 342. Accordingly, the five second images 341 to 345 are arranged at positions where three or more of them are not aligned in a straight line, thereby facilitating the operation of overlaying the clone image onto any one of second images 341 to 345 in the direction in which the clone image of first image 331 is moved.

As described above, MFP 100 in the first embodiment functions as a data processing apparatus. MFP 100 in the first embodiment displays the data select screen thereby to display a first image for identifying data, detects the position designated by the user with touch panel 169, and selects data identified by the first image as process target data and displays a clone image corresponding to the first image when the first image is designated continuously for a predetermined time. In response to the process target data being selected, MFP 100 further arranges and displays two second images for identifying two predetermined executable processes, among one or more kinds of processes that can be executed on the process target data, at positions defined based on the position where the first image is displayed. While the position designated by the user is being detected continuously, the clone image is moved with movement of the position designated by the user. When the clone image at least partially overlaps one of the two second images, the process identified by the second image overlapped with the clone image is decided as a candidate process. Thereafter, when the position designated by the user is no longer detected, the candidate process is decided as an execution process to be executed on the process target data. In this way, in response to the process target data being displayed, a clone image is displayed, and one or more second images are arranged and displayed at positions defined based on the position where the first image is displayed, thereby facilitating the operation of moving the clone image to the position where it overlaps any one of the one or more second images. Accordingly, designation of data and designation of a process to be executed on that data can be done with a single operation.

Two second images corresponding to predetermined two processes are displayed, so that one of the two processes can be designated. Furthermore, the two second images are displayed above the position where the first image is displayed, thereby preventing the two second images from being hidden under the user's hand designating the first image and from becoming out of sight of the user.

The two second images are arranged to be aligned in the horizontal direction at a distance longer than the horizontal length of the clone image, thereby preventing the clone image from overlapping the two second images at the same time.

When the number of one or more kinds of processes that can be executed on the process target data is three or more, MFP 100 arranges three or more second images for identifying three or more executable processes at positions, excluding the position below the first image, where three or more of the three or more second images are not aligned in the same straight line. The position where three or more of the three or more second images are not aligned in the same straight line refers to a position where, in any one of a plurality of sets of two second images included in the three or more second image, another second image is not arranged in a straight line specified by two second images included in the set. Specifically, three second images include three sets of two second images. Four second images include six sets of two second images. For example, for three seconds image A, B, and C, a first set of second image A and second image B, a second set of second image B and second image C, and a third set of second image A and second image C can be made. The positions where three or more of the three second images A, B, and C are not aligned in the same straight line refer to the positions where second image C is not arranged in a straight line between the respective midpoints of second image A and second image B in the first set, where second image A is not arranged in a straight line between the respective midpoints of second image B and second image C in the second set, and where second image B is not arranged in a straight line between the respective midpoints of second image A and second image C in the third set. Therefore, one of the three or more executable processes can be designated for the process target data. Three or more second images are arranged at positions where three or more of the three or more second images are not aligned in the same straight line, so that the three or more second images are arranged in different directions from the first image, whereby any one of the three or more second images can be selected in the direction in which the clone image is moved. In addition, the three or more second images are arranged at positions excluding the position below the first image, thereby preventing the three or more second images from being hidden under the user's hand designating the first image and from becoming out of sight of the user.

The three or more second images may be arranged at positions, excluding the position below the first image, where the directions from a predetermined position of the first image are different, rather than being arranged at positions where three or more of the three or more second images are not aligned in the same straight line. One or more second images are arranged at positions where the directions from a predetermined position of the first image are different, so that the user only has to vary the directions in which the finger is moved, in order to select any one of the one or more second images. The operation thus becomes easy. In addition, one or more second images are arranged at positions excluding the position below the first image, thereby preventing three or more second images from being hidden under the user's hand designating the first image and from becoming out of sight of the user.

One or more kinds of processes executable by MFP 100 are sorted into a plurality of modes. When any one of a plurality of modes is selected, one or more executable processes are decided from among the kinds of processes sorted into the selected mode. Accordingly, when the user selects a mode, one or more second images for identifying one or more processes sorted into the selected mode are displayed, thereby facilitating the operation of selecting a process.

While a candidate process is being decided, the second image for identifying the candidate process is displayed in an enlarged size, thereby notifying the user that the candidate process is being selected.

In addition, while a candidate process is being decided, the process name is displayed as identification information for identifying the candidate process, thereby notifying the user of the process name of the candidate process.

When a plurality of first images are arranged in the data select screen, one or more second images are displayed at positions where they do not overlap a plurality of first images. Therefore, the one or more first images are displayed in an easily visible manner, and the operation of overlaying the clone image onto any one of the one or more second images becomes easy.

Second Embodiment

The external view of MFP 100 in the second embodiment is the same as the perspective view shown in FIG. 1. The hardware configuration of MFP 100 in the second embodiment is the same as in the block diagram shown in FIG. 2. The plane view of the operation panel of MFP 100 in the second embodiment is the same as the plan view shown in FIG. 3.

Figure 12:
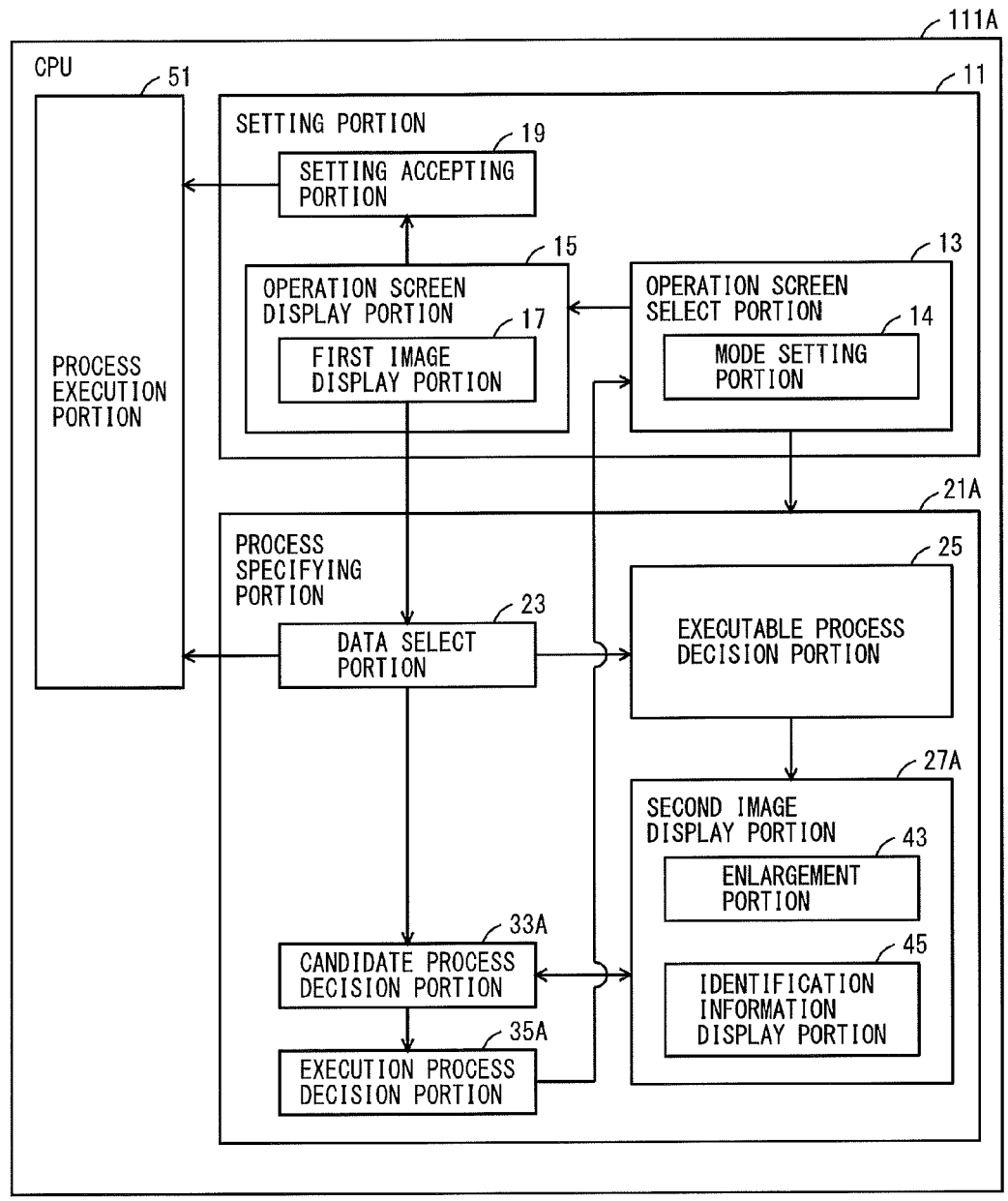
FIG. 12 is a block diagram showing an example of functions of the CPU of the MFP in a second embodiment.

FIG. 12 is a block diagram showing an example of functions of the CPU of the MFP in the second embodiment. Referring to FIG. 12, the functions of the CPU of the MFP in the second embodiment differ from those in the first embodiment as shown in FIG. 4 in that process specifying portion 21 is changed to a process specifying portion 21A. More specifically, clone image display portion 29 and clone image moving portion 31 of process specifying portion 21 shown in FIG. 4 are deleted, and second image display portion 27, candidate process decision portion 33, and executable process decision portion 35 are changed to a second image display portion 27A, a candidate process decision portion 33A, and an executable process decision portion 35A. The other functions are the same as the functions shown in FIG. 4, and therefore a description thereof will not be repeated here.

Process specifying portion 21A receives screen identification information from operation screen select portion 13. When the operation screen identified by the screen identification information input from operation screen select portion 13 is the data select screen, process specifying portion 21A also receives one or more first image information from first image display portion 17. When the operation screen displayed on LCD 165 is the data select screen, process specifying portion 21A selects process target data to be processed from among one or more data displayed in a selectable manner in the data select screen and specifies an execution process to be executed on the data to be processed.

Process specifying portion 21A includes data select portion 23 for selecting process target data, executable process decision portion 25 for deciding an executable process that can be executed on the process target data, second image display portion 27A, candidate process decision portion 33A, and execution process decision portion 35A for deciding an execution process.

Second image display portion 27A receives data identification information from data select portion 23 and receives process identification information from executable process decision portion 25. Second image display portion 27A arranges a second image for identifying the executable process specified by the process identification information at a position defined based on the position detected by touch panel 169 at the point of time when data identification information is input from data select portion 23. The data select part on the second layer is superimposed on the back ground part on the first layer displayed on LCD 165, so that the second image is arranged at the position defined based on the first image and is displayed on LCD 165.

When one or more second images are displayed, second image display portion 27A outputs one or more second image information related to the one or more second images arranged in the data select part to candidate process decision portion 33A. Each second image information includes process identification information of the process specified by the second image and area information indicating the position of the second image in LCD 165.

The second image is a predetermined thumbnail image corresponding to an executable process. For example, the second image corresponding to a print process that is one of executable processes is an image depicting a printer. The second image corresponding to a data transmission process that is one of executable processes is an image depicting a document being transmitted.

Second image display portion 27A decides the position detected by touch panel 169 at the point of time when data identification information is input from data select portion 23, as a start position. Then, when one process identification information is input from executable process decision portion 25, the second image corresponding to the process identification information is arranged and displayed above the start position. When two process identification information are input from executable process decision portion 25, second image display portion 27A arranges two second images corresponding to the two process identification information above the start position. Preferably, second image display portion 27A arranges two second images above the start portion such that they are aligned in the horizontal direction.

When three or more process identification information are input from executable process decision portion 25, second image display portion 27A arranges three or more second images corresponding to the three or more process identification information above the start position. Preferably, second image display portion 27A arranges three or more second images above the start position and such that they are aligned in the horizontal direction.

Preferably, when three or more process identification information are input from executable process decision portion 25, second image display portion 27 arranges three or more second images corresponding to the three or more process identification information in directions other than the downward direction from the start position and at positions where three or more of the three or more second images are not aligned in a straight line.

Candidate process decision portion 33A detects a relative positional relation between the position detected by touch panel 169 and one or more second images while the position designated by the user is being detected by touch panel 169 after the data identification information of the process target data is input from data select portion 23. If the position designated by the user as detected by touch panel 169 overlaps any one of the one or more second images, candidate process decision portion 33A determines that the second image overlapped with the position detected by touch panel 169 among the one or more second images and the position detected by touch 169 fall into a predetermined relative positional relation. Candidate process decision portion 33A decides the process identified by the second image overlapped with the position detected by touch panel 169 as a candidate process among the one or more second images. While a candidate process is being decided, candidate process decision portion 33A outputs the process identification information of the candidate process to execution process decision portion 35A and second image display portion 27A.

Candidate process decision portion 33A decides a process corresponding to the second image overlapped with the position detected by touch panel 169 as a candidate process while the position detected by touch panel 169 is overlapping any one of the one or more second images. When the user is moving the position designated on touch panel 169, the position detected by touch panel 169 may change from the state in which it overlaps one of the one or more second image to a state in which it does not overlap, and thereafter may overlap another second image. In this case, candidate process decision portion 33A decides a process identified by one second image as a candidate process during the state in which the position detected by touch panel 169 is overlapping the second image, does not decide a candidate process during the state in which the position detected by touch panel 169 does not overlap any of the one or more second images, and decides a process identified by another second image as a candidate process during the state in which the position detected by touch panel 169 is overlapping another second image.

Candidate process decision portion 33A may decide a second image arranged in the direction in which the position detected by touch panel 169 is moved, as a candidate process among the one or more second images. When the user is moving the designated position on touch panel 169, a state in which the direction in which the position detected by touch panel 169 is moved is toward one of the one or more second images may be change to a state in which it is toward another second image. In this case, candidate process decision portion 33A decides the process identified by one second image as a candidate process during the state in which the direction in which the position detected by touch panel 169 is moved is toward one second image of the one or more second images, and candidate process decision portion 33A decides the process identified by another second image as a candidate process during the state in which the direction in which the position detected by touch panel 169 is moved is toward another second image.

Second image display portion 27A includes an enlargement portion 43 and an identification information display portion 45. Enlargement portion 43 enlarges the size of the second image specified by the process identification information while the process identification information of the candidate process is being input from candidate process decision portion 33A. Accordingly, the second image decided as a candidate process among the one or more second images is displayed in an enlarges size, so that the user can visually recognize which of one or more second images is selected, and can recognize that a process corresponding to the second image is selected.

Identification information display portion 45 displays process identification information in the vicinity of the second image specified by the process identification information while the process identification information of the candidate process is being input from candidate process decision portion 33A. Accordingly, the user can recognize that the process having the process identification information is to be selected. The process identification information is preferably the name of the process. The position where the process identification information is displayed is preferably in the area adjacent to the second image specified by the process identification information, either on the right or left, or below or above. The position where the process identification information is displayed may be within the second image.

Execution process decision portion 35A decides the candidate process as an execution process to be executed on the process target data when the position designated by the user is no longer detected by touch panel 169 while the process identification information of the candidate process is being input from candidate process decision portion 33A. When an execution process is decided, execution process decision portion 35A outputs the process identification information for identifying the execution process to operation screen select portion 13.

Operation screen select portion 13 displays an operation screen on LCD 165 in the same manner as in the first embodiment. Operation screen select portion 13 displays a setting screen corresponding to the process specified by the process identification information on LCD 165, in response to the process identification information being input from execution process decision portion 35A when the data select screen is being displayed. The user inputs a setting value in accordance with the setting screen, whereby a setting value for each item is output to process execution portion 51 as a process condition for process execution portion 51 to execute the execution process.

Process execution portion 51 receives data identification information from data select portion 23 and receives a process condition from setting accepting portion 19. Process execution portion 51 sets the data specified by the data identification information input from data select portion 23 as process target data and executes the process in accordance with the process condition input from setting accepting portion 19.

Figure 13:
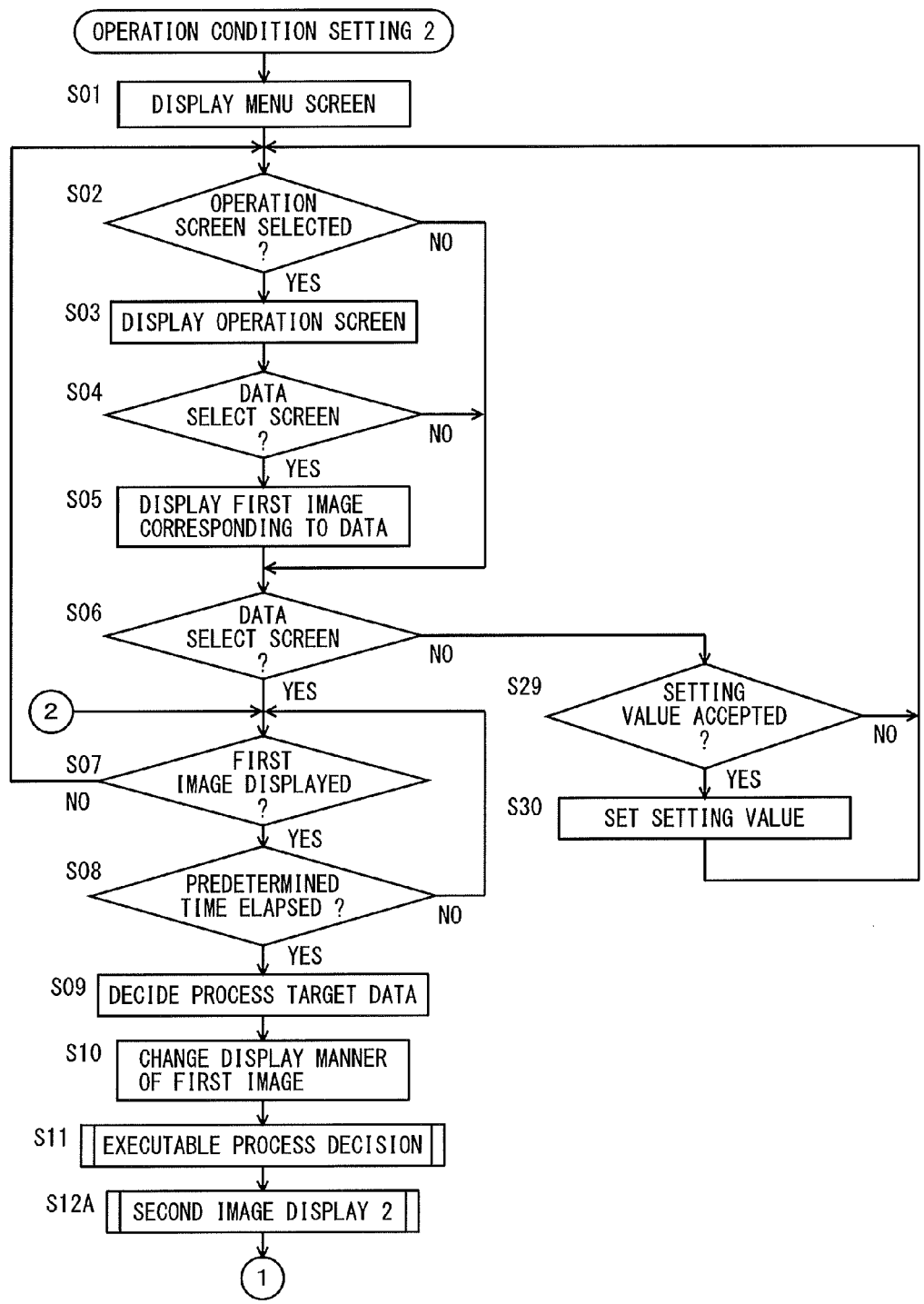
FIG. 13 is a first flowchart showing an exemplary flow of an operation condition setting process in the second embodiment.
Figure 14:
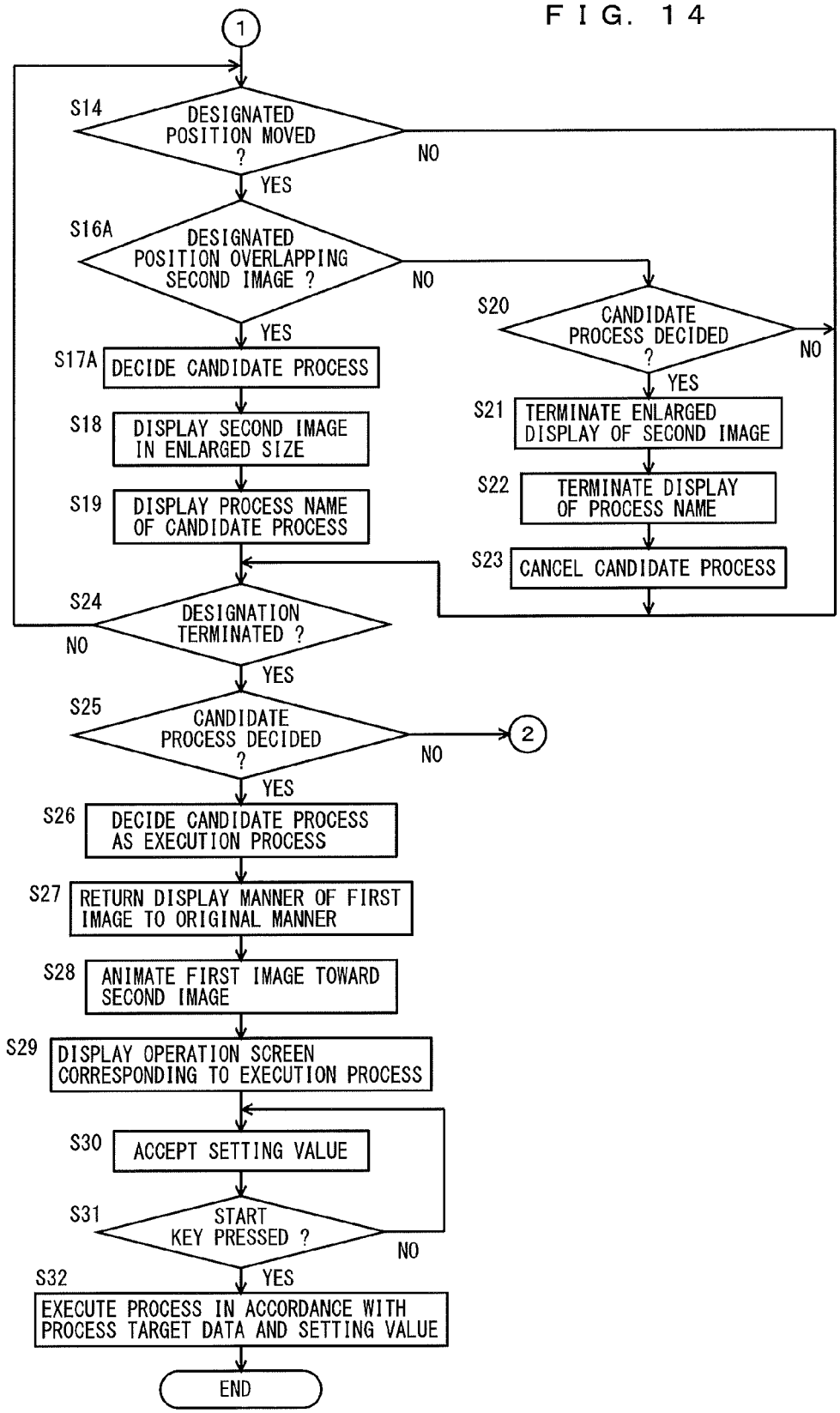
FIG. 14 is a second flowchart showing an exemplary flow of the operation condition setting process in the second embodiment.

FIG. 13 and FIG. 14 are flowcharts showing an exemplary flow of an operation condition setting process in the second embodiment. The operation condition setting process in the second embodiment is a process executed by CPU 111A by CPU 111A of MFP 100 in the second embodiment executing a setting program stored in ROM 113, HDD 115, or CD-ROM 118. Referring to FIG. 13 and FIG. 14, the operation condition setting process differs from that in the first embodiment shown in FIG. 5 and FIG. 6 in that steps S13 and S15 are deleted and in that steps S12, S16, and S17 are changed to steps S12A, S16A, and S17A, respectively. The other process is the same as the process shown in FIG. 5 and FIG. 6, and therefore a description thereof will not be repeated here.

Figure 15:
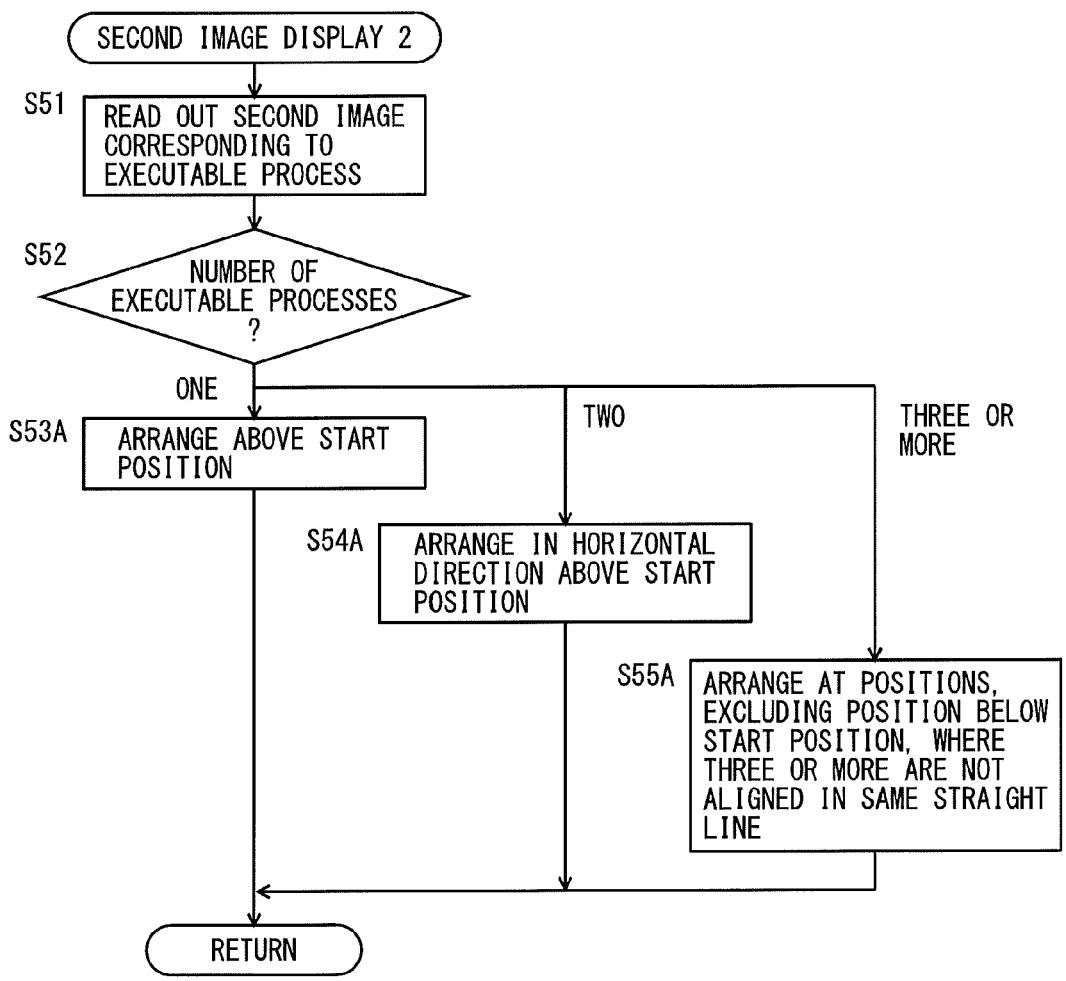
FIG. 15 is a flowchart showing an exemplary flow of a second image display process in the second embodiment.

In step S12A, a second image display process in the second embodiment is executed. The process then proceeds to step S14. FIG. 15 is a flowchart showing an exemplary flow of the second image display process in the second embodiment. The second image display process in the second embodiment is a process executed in step S12A in the operation condition setting process shown in FIG. 13. In the operation condition setting process in the second embodiment, process target data is decided in step S09, and an executable process is decided in step S11, before step S12A is executed. Referring to FIG. 15, the second image corresponding to the executable process is read out from HDD 115 (step S51). If a plurality of executable processes are decided, a plurality of second images corresponding to a plurality of executable processes are read out from HDD 115.

In step S52, the process branches depending on the number of executable processes. If there is one executable process, the process proceeds to step S53A. If there are two executable processes, the process proceeds to step S54A. If there are three or more executable processes, the process proceeds to step S55A.

In step S53A, one second image is displayed above the start position, and the process returns to the operation condition setting process. In step S54A, two second images are arranged and displayed above the start position in the horizontal direction, and the process returns the operation condition setting process. In step S55A, three or more second images are arranged and displayed in directions other than the downward direction from the start position, at positions where three or more of the three or more images are not aligned in the same straight line. The process then returns to the operation condition setting process.

Returning to FIG. 13 and FIG. 14, in step S12A, the second image display process in the second embodiment is executed, whereby one or more second images are displayed. Then, in the next step S14, it is determined whether the designated position is moved. If the position detected by touch panel 169 is changed since the first image is designated in step S07, it is determined that the designated position is moved. If it is determined that the designated position is moved, the process proceeds to step S16A. If not, the process proceeds to step S24.

In step S16A, it is determined whether the designated position overlaps any one of the one or more second images. If the position detected by touch panel 169 overlaps any one of the one or more second images, the process proceeds to step S17A. If not, the process proceeds to step S20.

In step S17A, a candidate process is decided. The process corresponding to the second image overlapped with the position detected by touch panel 169 is decided as a candidate process among the one or more second images.

Figure 16:
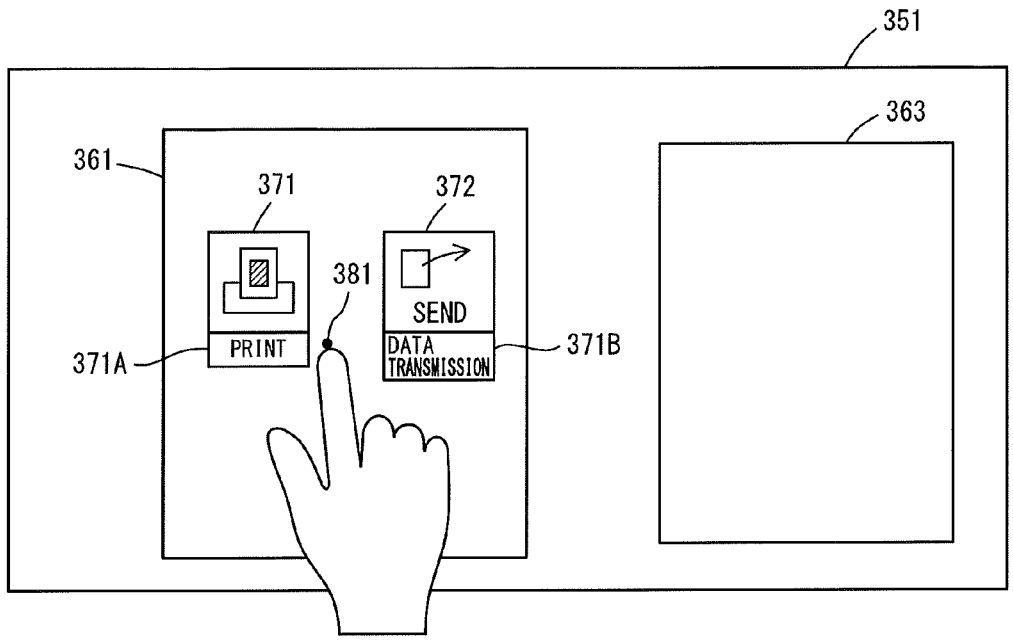
FIG. 16 is a first diagram showing an example of a data select screen in the second embodiment.

FIG. 16 is a first diagram showing an example of the data select screen in the second embodiment. Referring to FIG. 16, a data select screen 351 in the second embodiment includes a first image 361 and a second image 363 corresponding to two data. It is further shown that the user designates the inside of first image 361 with a finger 381. Two second images 371 and 372 are additionally displayed in first image 361. Second image 371 is an image corresponding to a print process and depicting a printer. Second image 372 is an image corresponding to a data transmission process and depicting a document being transmitted. The two second images 371 and 372 are arranged above a start position 381 designated by the user with the finger in the inside of the first image 361 and such that they are aligned in the horizontal direction.

A process is selected by the user moving the finger to one of second images 371 and 372 while touching touch panel 169. For example, if the position designated by the finger overlaps second image 371, a print process is selected. If the position designated by the finger overlaps second image 372, a data transmission process is selected.

Figure 17:
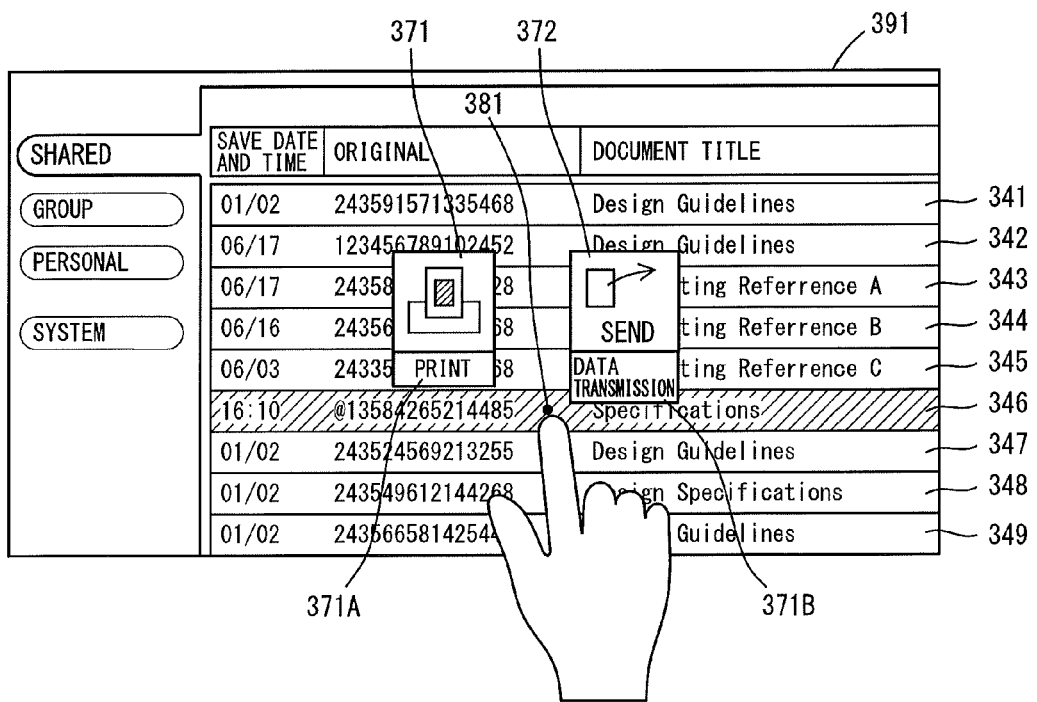
FIG. 17 is a second diagram showing an example of the data select screen in the second embodiment.

FIG. 17 is a second diagram showing an example of the data select screen in the second embodiment. Referring to FIG. 17, a data select screen 391 in the second embodiment includes character images such as file names of nine data, as first images 341 to 349. It is further shown that the user designates the inside of first image 346 with a finger. Two second images 371 and 372 are additionally displayed above first image 346 in the vicinity thereof. Second image 371 is an image corresponding to a print process and depicting a printer. Second image 372 is an image corresponding to a data transmission process and depicting a document being transmitted. The two second images 371 and 372 are arranged above start position 381 designated by the user with the finger in the inside of first image 361 and such that they are aligned in the horizontal direction.

A process is selected by the user moving the finger to one of second images 371 and 372 while touching touch panel 169. For example, if the position designated by the finger overlaps second image 371, a print process is selected. If the position designated by the finger overlaps second image 372, a data transmission process is selected.

As described above, MFP 100 in the second embodiment functions as a data processing apparatus. MFP 100 in the second embodiment displays the data select screen thereby to display a first image for identifying data, detects the position designated by the user with touch panel 169, and selects data identified by the first image as process target data when the first image is designated continuously for a predetermined time. In response to the process target data being selected, MFP 100 arranges and displays two second images for identifying predetermined two executable processes, among one or more kinds of processes that can be executed on the process target data, at positions defined based on the position designated by the user. Then, if the position designated by the user overlaps one of the two second images while the position designated by the user is continuously detected, the process identified by the second image overlapped with the position designated by the user is decided as a candidate process. Thereafter, when the position designated by the user is no longer detected, the candidate process is decided as an execution process to be executed on the process target data. In this way, in response to process target data being selected, one or more second images are arranged and displayed at positions defined based on the position designated by the user, thereby facilitating the operation of moving the position designated by the user to the position where it overlaps any one of the one or more second images. Accordingly, designation of data and designation of a process to be executed on that data can be done with a single operation.

Two second images corresponding to predetermined two processes are displayed, so that one of the two processes can be designated. Furthermore, the two second images are displayed above the start position designated by the user, thereby preventing the two second images from being hidden under the user's hand designating the first image and from becoming out of sight of the user.

When the number of one or more kinds of processes that can be executed on the process target data is two or more, two second images for identifying the two executable processes are arranged above the start position. Therefore, one of the two processes that can be executed on the process target data can be designated. The two second images are arranged above the start position designated by the user, thereby preventing the two second images from being hidden under the user's hand designating the first image and from becoming out of sight of the user.

The two second images are arranged such that they are aligned in the horizontal direction above the start position, so that the two second images can be arranged in different directions from the start position designated by the user.

When the number of one or more kinds of processes that can be executed on the process target data is three or more, three or more second images for identifying three or more executable processes are arranged at positions, excluding a position below the start position designated by the user, where three or more of the three or more second images are not aligned in the same straight line. Accordingly, one can be designated from among three or more executable processes that can be executed on the process target data. The three or more second images are arranged at positions where three or more of the three or more second images are not aligned in the same straight line, so that the three or more second images can be arranged such that the directions from the start position designated by the user are different, thereby facilitating the operation of selecting any one of the three or more second images. The three or more second images are arranged at positions excluding the position below the start position designated by the user, thereby preventing the three or more second images from being hidden under the user's hand designating the first image and from becoming out of sight of the user.

One or more second images are arranged at positions where the directions from the start position are different, so that the user only has to vary the direction of the operation of moving the finger from the start position in order to select any one of the one or more second images. The operation thus becomes easy. One or more second image are arranged at positions excluding the position below the first image, thereby preventing three or more second images from being hidden under the user's hand designating the first image and from becoming out of sight of the user.

In the foregoing embodiments, MFP 100 has been described as an example of the data processing apparatus. However, it is needless to say that the present invention can be understood as a setting method for allowing MFP 100 to execute the operation condition setting process shown in FIG. 5 to FIG. 8 or FIG. 12 to FIG. 15 or a setting program for allowing CPU 111 controlling MFP 100 to execute the setting method.

Although the present invention has been described and illustrated in detail, it is clearly understood that the same is by way of illustration and example only and is not to be taken by way of limitation, the spirit and scope of the present invention being limited only by the terms of the appended claims.

<Remarks>

(1) The data processing apparatus according to any one of claims 1 to 5, wherein the predetermined relative positional relation is a positional relation of being at least partially overlapped with the clone image displayed by the clone image display means.

(2) The data processing apparatus according to any one of claims 1 to 5, wherein the predetermined relative positional relation is a positional relation of being arranged in a direction in which the clone image is moved, based on the clone image displayed by the clone image moving means.

(3) The data processing apparatus according to any one of claims 7 to 13, wherein the predetermined relative positional relation is a positional relation of being overlapped with the position detected by the position detection means.

(4) The data processing apparatus according to any one of claims 7 to 13, wherein the predetermined relative positional relation is a positional relation of being arranged in a direction in which the position continuously detected by the position detection means is moved, based on the position detected by the position detection means.

(5) The data processing apparatus according to any one of claims 1 to 16, (1) to (4), wherein the data select means selects data identified by the first image as process target data to be processed, in response to a position in the first image displayed on the display means being detected by the position detection means continuously for a predetermined time.

(6) The data processing apparatus according to any one of claims 1 to 16, (1) to (4), wherein the data select means selects data identified by the first image as process target data to be processed, in response to a predetermined area in the first image displayed on the display means being detected by the position detection means.

(7) The data processing apparatus according to any one of claims 1 to 16, (1) to (6), wherein the first image display means displays the first image for identifying the process target data in a display manner different from before the process target data is selected by the data select means, in response to the process target data being selected by the data select means.

(8) The data processing apparatus according to any one of claims 1 to 16, (1) to (7), further comprising angle changing means for changing an angle of the display surface of the display means within a range of predetermined angles from where the normal to the display surface is vertical relative to the ground.

What is claimed is:

1. A data processing apparatus comprising:
   a display screen configured to display an image;
   a position detection portion to detect a position designated by a user on a display surface of the display screen; and
   a processor that
   controls execution of one or more kinds of processes on data;
   displays a first image for identifying data on the display screen;
   selects data identified by the first image displayed on the display screen as process target data to be processed, based on the position detected by the position detection portion;
   arranges a clone image corresponding to the first image for identifying the process target data at the position detected by the position detection portion and displays the arranged clone image on the display screen, in response to the process target data being selected by the processor;
   moves the clone image by arranging the clone image at the position detected by the position detection portion and displays the arranged clone image on the display screen while the position is continuously detected by the position detection portion after the process target data is selected by the processor;
   arranges one or more second images for identifying one or more kinds of processes that can be executed by the data processing apparatus on the process target data, at positions defined based on a position where the first image is displayed, and displays the arranged one or more second images on the display screen, in response to the process target data being selected by the processor;
   decides a process identified by the second image having a predetermined relative positional relation to the clone image as a candidate process among the one or more second images when the clone image displayed by the processor falls into a predetermined relative positional relation to any one of the one or more second images; and
   decides the candidate process as an execution process to be executed by the data processing apparatus on the process target data when the position is no longer detected by the position detection portion in a state in which the clone image falls in a predetermined relative positional relation to the second image for identifying the candidate process.

2. The data processing apparatus according to claim 1, wherein the processor arranges two second images for identifying predetermined two of the one or more kinds of processes that can be executed by the data processing apparatus on the process target data, above a position where the first image is displayed.

3. The data processing apparatus according to claim 1, wherein the processor decides one or more executable processes that can be executed on the process target data from among the one or more kinds of processes that can be executed by the data processing apparatus, wherein
   when two executable processes are decided by the processor, the processor arranges two second images for identifying the two executable processes decided by the processor, above a position where the first image is displayed.

4. The data processing apparatus according to claim 3, wherein the processor arranges the two second images such that the two second images are aligned in a horizontal direction at a distance longer than a horizontal length of the clone image.

5. The data processing apparatus according to claim 3, wherein
the one or more kinds of processes that can be executed by the data processing apparatus are sorted into a plurality of modes, and
the processor selects any one of the plurality of modes, and decides the one or more executable processes from among the kinds of processes sorted into a mode selected by the processor.

6. The data processing apparatus according to claim 1, wherein the processor decides one or more executable processes that can be executed on the process target data from among the one or more kinds of processes that can be executed by the data processing apparatus, wherein
when three or more executable processes are decided by the processor, the processor arranges three or more second images for identifying the three or more executable processes decided by the processor, at positions, excluding a position below the first image, where three or more of the three or more second images are not aligned in a same straight line.

7. The data processing apparatus according to 1, wherein the processor decides one or more executable processes that can be executed on the process target data from among the one or more kinds of processes that can be executed by the data processing apparatus, wherein
the processor is configured to arrange one or more second images for identifying the one or more executable processes decided by the processor, at positions, excluding a position below the first image, where directions from a predetermined position in the first image for identifying the process target data are different.

8. The data processing apparatus according to claim 1, wherein the processor controls display of the second image for identifying a candidate process in a larger size than before the candidate process is decided by the processor, while the candidate process is being decided by the processor.

9. The data processing apparatus according to claim 1, wherein the processor controls display of identification information for identifying a candidate process next to the second image, while the candidate process is being decided by the processor.

10. The data processing apparatus according to claim 1, wherein the processor, based on an execution history of each of the one or more kinds of processes, selects a predetermined number of processes in order of an execution count, and arranges for display the one or more second images to identify the selected predetermined number of processes at a position defined based on the position where the first image is displayed.

11. The data processing apparatus according to claim 1, further comprising
a plurality of modes, wherein
each of the plurality of modes is associated with one of the one or more kinds of processes, and
the processor, in a case where one of the plurality of modes is selected, arranges for display the one or more second images to identify the one or more kinds of processes corresponding to a mode being set, at a position defined based on the position where said first image is displayed.

12. A data processing apparatus comprising:
a display screen configured to display an image;
a position detection portion configured to detect a position designated by a user on a display surface of the display screen; and
a processor that
controls execution of one or more kinds of processes on data;
displays a first image for identifying data on the display screen portion;
selects data identified by the first image displayed on the display screen as process target data to be processed, based on the position detected by the position detection portion;
arranges one or more second images for identifying one or more kinds of processes that can be executed by the data processing apparatus on the process target data, at positions defined based on a start position detected by the position detection portion at a point of time when the process target data is selected by the processor, and displays the arranged one or more second images on the display screen, in response to the process target data being selected by the processor;
decides a process identified by the second image having a predetermined relative positional relation to the position continuously detected by the position detection portion as a candidate process among the one or more second images when the position continuously detected by the position detection portion falls into a predetermined relative positional relation to any one of the one or more second images; and
decides the candidate process as an execution process to be executed by the data processing apparatus on the process target data when the position is no longer detected by the position detection portion in a state in which the position detected by the position detection portion falls in a predetermined relative positional relation to the second image for identifying the candidate process.

13. The data processing apparatus according to claim 12, wherein the processor arranges two second images for identifying predetermined two of the one or more kinds of processes that can be executed by the data processing apparatus on the process target data, above the start position detected by the position detection portion at a point of time when the process target data is selected by the processor.

14. The data processing apparatus according to claim 12, one or more executable processes that can be executed on the process target data from among the one or more kinds of processes that can be executed by the data processing apparatus, wherein
when two executable processes are decided by the processor, the processor arranges two second images for identifying the two executable processes decided by the processor, above the start position.

15. The data processing apparatus according to claim 14, wherein the processor arranges the two second images such that the two second images are aligned in a horizontal direction above the start position.

16. The data processing apparatus according to claim 14, wherein
the one or more kinds of processes that can be executed by the data processing apparatus are sorted into a plurality of modes, and
the processor selects any one of the plurality of modes, and decides the one or more executable processes from among the kinds of processes sorted into a mode selected by the processor.

17. The data processing apparatus according to claim 12, wherein the processor decides one or more executable processes that can be executed on the process target data from among the one or more kinds of processes that can be executed by the data processing apparatus, wherein when three or more executable processes are decided by the processor, the processor is configured to arrange three or more second images for identifying the three or more executable processes decided by the processor, at positions, excluding a position below the start position, where three or more of the three or more second images are not aligned in a same straight line.

18. The data processing apparatus according to 12, wherein the processor is further configured to decide one or more executable processes that can be executed on the process target data from among the one or more kinds of processes that can be executed by the data processing apparatus, wherein
when three or more executable processes are decided by the processor, the processor arranges three or more second images for identifying the three or more executable processes decided by the processor, at positions above the start position and such that the three or more second images are aligned in a horizontal direction.

19. The data processing apparatus according to 12, wherein the processor decides one or more executable processes that can be executed on the process target data from among the one or more kinds of processes that can be executed by the data processing apparatus, wherein
when three or more executable processes are decided by the processor, the processor arranges three or more second images for identifying the three or more executable processes decided by the processor, at positions, excluding a position below the start position, where directions from the start position are different.

20. The data processing apparatus according to claim 12, wherein the processor controls display of the second image for identifying a candidate process in a larger size than before the candidate process is decided by the processor, while the candidate process is being decided by the processor.

21. The data processing apparatus according to claim 12, wherein the processor controls display of identification information for identifying a candidate process next to the second image, while the candidate process is being decided by the processor.

22. The data processing apparatus according to claim 12, wherein when a plurality of first images for identifying a plurality of data are displayed by the processor on the display screen, the processor controls display of one or more second images for identifying the one or more processes that can be executed by the data processing apparatus on the process target data selected by the processor, at positions where the one or more second images do not overlap the plurality of first images.

23. The data processing apparatus according to claim 12, wherein the processor, based on an execution history of each of the one or more kinds of processes, selects a predetermined number of processes in order of an execution count, and arranges for display the one or more second images to identify the selected predetermined number of processes at a position defined based on the position where the first image is displayed.

24. The data processing apparatus according to claim 12, further comprising
a plurality of modes, wherein
each of the plurality of modes is associated with one of the one or more kinds of processes, and
the processor, in a case where one of the plurality of modes is selected, arranges for display the one or more second images to identify the one or more kinds of processes corresponding to a mode being set, at a position defined based on the position where said first image is displayed.

25. A setting method executed in a data processing apparatus,
the data processing apparatus including
a processor that controls execution of executing one or more kinds of processes on data, and
a display screen capable of displaying an image,
the method comprising:
a position detection step of detecting a position designated by a user in a display surface of the display screen;
a first image display step of displaying a first image for identifying data on the display screen;
a data select step of selecting data identified by the first image displayed on the display screen as process target data to be processed, based on the position detected in the position detection step;
a clone image display step of arranging a clone image corresponding to the first image for identifying the process target data at the position detected in the position detection step and displaying the arranged clone image on the display screen, in response to the process target data being selected in the data select step;
a clone image moving step of moving the clone image by arranging the clone image at the position detected in the position detection step and displaying the arranged clone image on the display screen while the position is continuously detected in the position detection step after the process target data is selected in the data select step;
a second image display step of arranging one or more second images for identifying one or more kinds of processes that can be executed by the data processing apparatus on the process target data, at positions defined based on a position where the first image is displayed, and displaying the arranged one or more second images on the display screen, in response to the process target data being selected in the data select step;
a candidate process decision step of deciding a process identified by the second image having a predetermined relative positional relation to the clone image as a candidate process among the one or more second images when the clone image displayed in the clone image moving step falls into a predetermined relative positional relation to any one of the one or more second images; and
an execution process decision step of deciding the candidate process as an execution process to be executed by the data processing apparatus on the process target data when the position is no longer detected in the position detection step in a state in which the clone image falls in a predetermined relative positional relation to the second image for identifying the candidate process.

26. The setting method executed in the data processing apparatus according to claim 25, further comprising:
selecting, based on an execution history of each of the one or more kinds of processes, a predetermined number of processes in order of an execution count, and arranging for display the one or more second images to identify the selected predetermined number of processes at a position defined based on the position where the first image is displayed.

27. The setting method executed in the data processing apparatus according to claim 25,
wherein the data processing apparatus includes a plurality of modes, and
the method further comprises:
associating each of the plurality of modes with one of the one or more kinds of processes, and arranging, in a case where one of the plurality of modes is selected, for display the one or more second images to identify the one or more kinds of processes corresponding to a mode being set, at a position defined based on the position where said first image is displayed.

28. A setting method executed in a data processing apparatus,
the data processing apparatus including
a processor that controls execution of one or more kinds of processes on data, and
a display screen configured to display an image,
the method comprising:
a position detection step of detecting a position designated by a user in a display surface of the display screen;
a first image display step of displaying a first image for identifying data on the display screen;
a data select step of selecting data identified by the first image displayed on the display screen as process target data to be processed, based on the position detected in the position detection step;
a second image display step of arranging one or more second images for identifying one or more kinds of processes that can be executed by the data processing apparatus on the process target data, at positions defined based on a start position detected in the position detection step at a point of time when the process target data is selected in the data select step, and displaying the arranged one or more second images on the display screen, in response to the process target data being selected in the data select step;
a candidate process decision step of deciding a process identified by the second image having a predetermined relative positional relation to the position continuously detected in the position detection step as a candidate process among the one or more second images when the position continuously detected in the position detection step falls into a predetermined relative positional relation to any one of the one or more second images; and
an execution process decision step of deciding the candidate process as an execution process to be executed by the data processing apparatus on the process target data when the position is no longer detected in the position detection step in a state in which the position detected in the position detection step falls in a predetermined relative positional relation to the second image for identifying the candidate process.

29. The setting method executed in the data processing apparatus according to claim 28, further comprising:
selecting, based on an execution history of each of the one or more kinds of processes, a predetermined number of processes in order of an execution count, and arranging for display the one or more second images to identify the selected predetermined number of processes at a position defined based on the position where the first image is displayed.

30. The setting method executed in the data processing apparatus according to claim 28,
wherein the data processing apparatus includes a plurality of modes, and
the method further comprises:
associating each of the plurality of modes with one of the one or more kinds of processes, and
arranging, in a case where one of the plurality of modes is selected, for display the one or more second images to identify the one or more kinds of processes corresponding to a mode being set, at a position defined based on the position where said first image is displayed.

31. A non-transitory computer-readable recording medium encoded with a setting program performed by a computer which controls a data processing apparatus,
the data processing apparatus including
a processor that controls execution of one or more kinds of processes on data, and
a display screen configured to display an image,
the setting program causing the computer to execute:
a position detection step of detecting a position designated by a user in a display surface of the display screen;
a first image display step of displaying a first image for identifying data on the display screen;
a data select step of selecting data identified by the first image displayed on the display screen as process target data to be processed, based on the position detected in the position detection step;
a clone image display step of arranging a clone image corresponding to the first image for identifying the process target data at the position detected in the position detection step and displaying the arranged clone image on the display screen, in response to the process target data being selected in the data select step;
a clone image moving step of moving the clone image by arranging the clone image at the position detected in the position detection step and displaying the arranged clone image on the display screen while the position is continuously detected in the position detection step after the process target data is selected in the data select step;
a second image display step of arranging one or more second images for identifying one or more kinds of processes that can be executed by the data processing apparatus on the process target data, at positions defined based on a position where the first image is displayed, and displaying the arranged one or more second images on the display screen, in response to the process target data being selected in the data select step;
a candidate process decision step of deciding a process identified by the second image having a predetermined relative positional relation to the clone image as a candidate process among the one or more second images when the clone image displayed in the clone image moving step falls into a predetermined relative positional relation to any one of the one or more second images; and
an execution process decision step of deciding the candidate process as an execution process to be executed by the data processing apparatus on the process target data when the position is no longer detected in the position detection step in a state in which the clone image falls in a predetermined relative positional relation to the second image for identifying the candidate process.

32. The non-transitory computer-readable recording medium according to claim 31, wherein the setting program further causes the computer to execute:
selecting, based on an execution history of each of the one or more kinds of processes, a predetermined number of processes in order of an execution count, and arranging for display the one or more second images to identify the selected predetermined number of processes at a position defined based on the position where the first image is displayed.

33. The non-transitory computer-readable recording medium according to claim 31, wherein
the data processing apparatus includes a plurality of modes, and the setting program further causes the computer to execute:
associating each of the plurality of modes with one of the one or more kinds of processes, and
arranging, in a case where one of the plurality of modes is selected, for display the one or more second images to identify the one or more kinds of processes corresponding to a mode being set, at a position defined based on the position where said first image is displayed.

34. A non-transitory computer-readable recording medium encoded with a setting program performed by a computer which controls a data processing apparatus,
the data processing apparatus including
a processor that controls execution of one or more kinds of processes on data, and
a display screen configured to display an image,
the setting program causing the computer to execute:
a position detection step of detecting a position designated by a user in a display surface of the display screen;
a first image display step of displaying a first image for identifying data on the display screen;
a data select step of selecting data identified by the first image displayed on the display screen as process target data to be processed, based on the position detected in the position detection step;
a second image display step of arranging one or more second images for identifying one or more kinds of processes that can be executed by the data processing apparatus on the process target data, at positions defined based on a start position detected in the position detection step at a point of time when the process target data is selected in the data select step, and displaying the arranged one or more second images on the display screen, in response to the process target data being selected in the data select step;
a candidate process decision step of deciding a process identified by the second image having a predetermined relative positional relation to the position continuously detected in the position detection step as a candidate process among the one or more second images when the position continuously detected in the position detection step falls into a predetermined relative positional relation to any one of the one or more second images; and
an execution process decision step of deciding the candidate process as an execution process to be executed by the data processing apparatus on the process target data when the position is no longer detected in the position detection step in a state in which the position detected in the position detection step falls in a predetermined relative positional relation to the second image for identifying the candidate process.

35. The non-transitory computer-readable recording medium according to claim 34, wherein the setting program further causes the computer to execute:
selecting, based on an execution history of each of the one or more kinds of processes, a predetermined number of processes in order of an execution count, and arranging for display the one or more second images to identify the selected predetermined number of processes at a position defined based on the position where the first image is displayed.

36. The non-transitory computer-readable recording medium according to claim 34, wherein
the data processing apparatus includes a plurality of modes, and
the setting program further causes the computer to execute:
associating each of the plurality of modes with one of the one or more kinds of processes, and
arranging, in a case where one of the plurality of modes is selected, for display the one or more second images to identify the one or more kinds of processes corresponding to a mode being set, at a position defined based on the position where said first image is displayed.

* * * * *